(12) United States Patent
Hashmi

(10) Patent No.: US 10,887,284 B1
(45) Date of Patent: *Jan. 5, 2021

(54) PEERED VIRTUAL PRIVATE NETWORK ENDPOINT NODES

(71) Applicant: AMAZON TECHNOLOGIES, INC., Seattle, WA (US)

(72) Inventor: Omer Hashmi, Chevy Chase, MD (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,842

(22) Filed: May 2, 2019

Related U.S. Application Data

(63) Continuation of application No. 15/277,962, filed on Sep. 27, 2016, now Pat. No. 10,397,189.

(51) Int. Cl.
*H04L 29/06* (2006.01)
*H04L 12/26* (2006.01)
*H04L 9/08* (2006.01)

(52) U.S. Cl.
CPC ........ *H04L 63/0272* (2013.01); *H04L 9/0841* (2013.01); *H04L 43/10* (2013.01); *H04L 63/0428* (2013.01)

(58) Field of Classification Search
CPC .... H04L 63/0272; H04L 9/0841; H04L 43/10
See application file for complete search history.

(56) References Cited

U.S. PATENT DOCUMENTS

| | | | |
|---|---|---|---|
| 7,689,722 B1 * | 3/2010 | Timms | H04L 63/164 709/249 |
| 8,443,077 B1 * | 5/2013 | Lappas | G06F 3/065 709/224 |
| 8,958,293 B1 | 2/2015 | Anderson | |
| 10,397,189 B1 * | 8/2019 | Hashmi | H04L 63/0272 |
| 2007/0016663 A1 * | 1/2007 | Weis | G06F 11/2041 709/223 |
| 2008/0168037 A1 | 7/2008 | Kapadia et al. | |
| 2011/0150223 A1 | 6/2011 | Qi et al. | |
| 2011/0282996 A1 * | 11/2011 | Zahavi | H04L 41/12 709/226 |

(Continued)

OTHER PUBLICATIONS

NPL Search (Google Scholar) (Year: 2020).*

*Primary Examiner* — Mahfuzur Rahman
*Assistant Examiner* — Richard W Cruz-Franqui
(74) *Attorney, Agent, or Firm* — Knobbe Martens Olson & Bear, LLP

(57) ABSTRACT

A provider network includes a service that creates virtual private network (VPN) endpoint nodes. Application programming interfaces are available that the creation of VPN endpoint nodes, peer them together, and attach them to respective virtual private networks to thereby establish communication tunnels between pairs of virtual private networks. Each VPN endpoint node may be implemented as a fault tolerant endpoint node in which the node is created as a plurality of virtual machines. Each of the virtual machines is configured from a common machine image that includes software capable of causing the respective virtual machine to configure a tunnel such as an IPSec tunnel. One of the virtual machines, however, is operated in an active mode, while another virtual machine is configured to operate in a standby mode.

20 Claims, 10 Drawing Sheets

(56) References Cited

U.S. PATENT DOCUMENTS

| | | | |
|---|---|---|---|
| 2012/0151477 A1* | 6/2012 | Sinha | G06F 9/45558 |
| | | | 718/1 |
| 2012/0185913 A1 | 7/2012 | Martinez et al. | |
| 2012/0290869 A1 | 11/2012 | Heitz | |
| 2014/0280884 A1* | 9/2014 | Searle | H04L 43/0864 |
| | | | 709/224 |
| 2014/0365626 A1* | 12/2014 | Radhakrishnan | G06F 9/5027 |
| | | | 709/222 |
| 2015/0052524 A1 | 2/2015 | Raghu | |
| 2015/0381456 A1* | 12/2015 | He | H04L 41/142 |
| | | | 709/224 |
| 2016/0239350 A1* | 8/2016 | Kamawat | G06F 9/5088 |
| 2017/0063648 A1 | 3/2017 | Nadaf et al. | |
| 2018/0091417 A1* | 3/2018 | Ore | H04L 63/02 |
| 2018/0176073 A1* | 6/2018 | Dubey | H04L 41/0672 |

* cited by examiner

PEERED VIRTUAL PRIVATE NETWORK ENDPOINT NODES

CROSS-REFERENCE TO RELATED APPLICATION

This application is a continuation of U.S. patent application Ser. No. 15/277,962, filed Sep. 27, 2016, and titled "Peered Virtual Private Network Endpoint Nodes," which is incorporated herein by reference. This disclosure contains subject matter that may be related to subject matter in copending U.S. patent application Ser. No. 15/277,929, filed Sep. 27, 2016, and titled "Fault Tolerant Virtual Private Network Endpoint Node," which is incorporated herein by reference.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine (e.g., a server) to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Communication pipelines can be established facilitating traffic between virtual machines and between logical groupings of virtual machines.

BRIEF DESCRIPTION OF THE DRAWINGS

For a detailed description of various examples, reference will now be made to the accompanying drawings in which.

DETAILED DESCRIPTION

Figure 1:
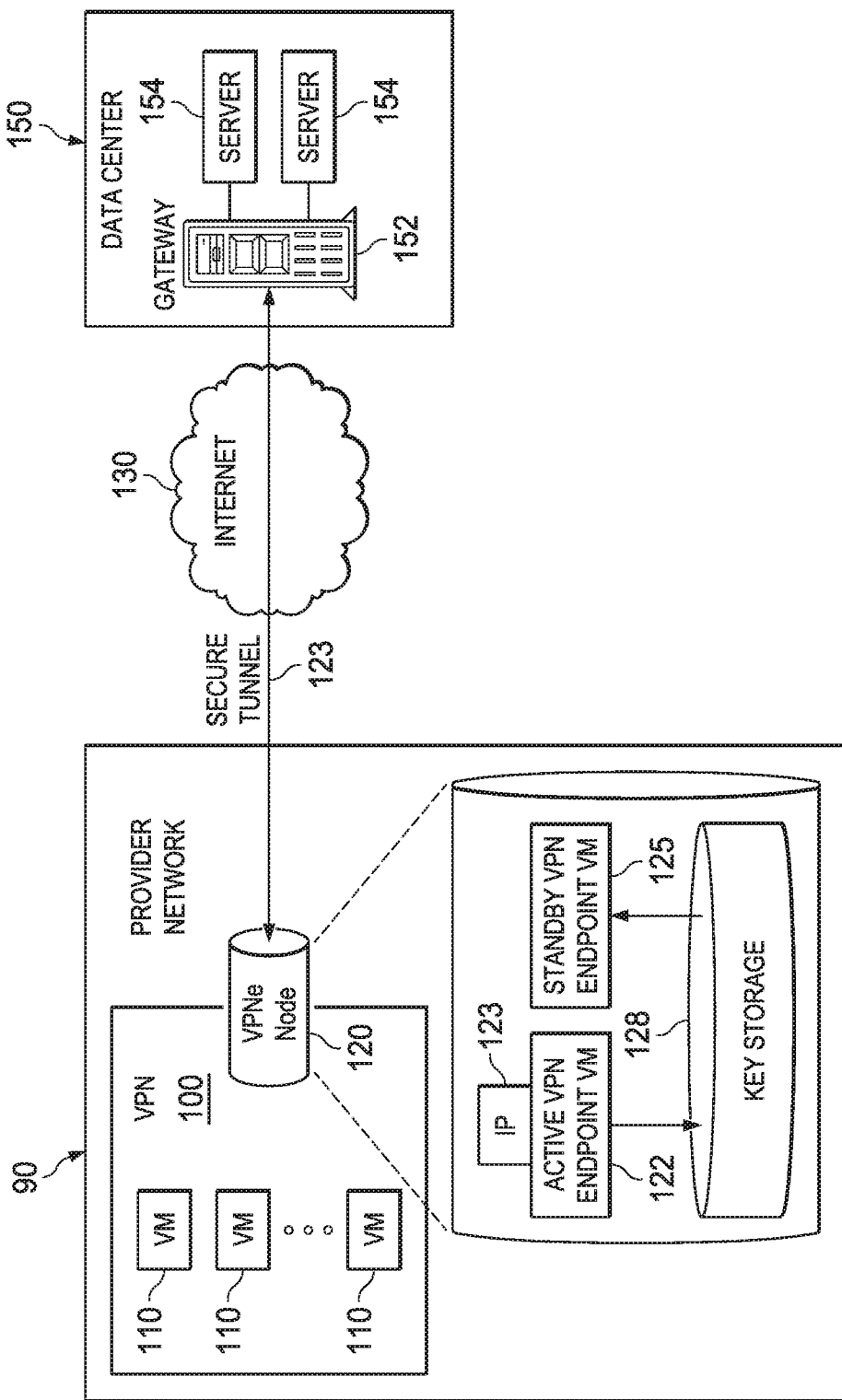
FIG. 1 shows an example of a virtual private network (VPN) attached to a fault tolerant VPN endpoint node coupled by a secure tunnel to a remote gateway in accordance with various embodiments.

A provider network is described herein that permits customers to request the creation of a fault tolerant virtual private network (VPN) endpoint (VPNe) node and to then connect the fault tolerant VPN endpoint to a virtual private network which includes one or more of the customers' virtual machines. A customer can then cause a secure tunnel to be established between the VPN endpoint (and thus the customer's virtual private network) and a remote node such as another VPN endpoint node, a networking device such as a gateway on the customer's premise, etc. Another network may be attached to the remote node. In some embodiments, two VPN endpoint nodes are peered together to permit their respective virtual private networks to be in communication with one another via a secure tunnel. In response to a request submitted by the customer for creation of the fault tolerant VPN endpoint node, a provisioning service within the provider network causes a pair of virtual machines to be launched from a machine image that contains an application that implements VPN endpoint functionality. Both virtual machines contain an application that performs the functionality of a VPN endpoint, including implementing one or protocols for establishing a secure tunnel to a remote node, recalculating keys such as encryption keys, negotiating security protocols with the remote node, etc. In one embodiment, the protocol implemented by the VPN endpoint virtual machine application includes the Internet Protocol Security (IPSec) protocol.

One of the VPN endpoint virtual machines that is created to implement the fault tolerant VPN endpoint node can be assigned a public IP address which it uses, as well as other information, to establish the tunnel with the remote node, and the other VPN endpoint virtual machine is not assigned the public IP address and thus is not able to establish the tunnel. The VPN endpoint virtual machine that is presently assigned the public IP address and thus can establish the tunnel is referred to herein as the "active mode" VPN virtual machine, and the VPN endpoint virtual machine that presently is not assigned the public IP address is referred to as the "standby mode" VPN virtual machine. The active and standby modes can be switched between the VPN virtual machines such as, for example, during a failover process as described herein. The fault tolerant VPN endpoint node can be created with more than one standby mode VPN endpoint virtual machine to provide additional degrees of fault tolerance. The active mode VPN endpoint virtual machine is configured by the provisioning service with an elastic IP address that is used, along with other state information configured into the virtual machine, to establish the secure tunnel to the remote node over which encrypted packets between the customer's private network and a network attached to the remote node can be exchanged. The standby mode VPN endpoint virtual machine also has an application that can permit that virtual machine to continue the operation and control of the tunnel to the same remote node should the active mode VPN endpoint virtual machine be unable to continue satisfactory operation. While in the standby mode, the standby mode VPN endpoint virtual machine, however, does not have the IP address for the tunnel and thus does not actually establish and control the tunnel with respect to the remote mode. The standby mode VPN endpoint virtual machine, however, can be transitioned to the active mode (e.g., by moving the IP address from the active mode VPN endpoint virtual machine to the standby mode VPN endpoint virtual machine) if the active mode VPN endpoint virtual machine experiences a failure. In some embodiments, the provider network implements a health monitoring service that monitors heartbeat messages from the active and standby mode VPN endpoint virtual machines. Each heartbeat message includes information about the health of the respective virtual machine. If the active mode VPN endpoint virtual machine reports a failure or insufficient heartbeat messages are received, the health monitoring service may initiate a fail-over from the active mode VPN endpoint virtual machine to the standby mode VPN endpoint virtual machine. That is, the standby mode VPN endpoint virtual machine is transitioned to the active mode and the tunnel is connected to that virtual machine instead of the failed VPN endpoint virtual machine. The local (i.e., public) IP address of the VPN endpoint is re-assigned from the failed VPN endpoint virtual machine to the former standby mode VPN endpoint virtual machine, which is now in the active mode. The secure tunnel continues to operate albeit from the newly activated VPN endpoint virtual machine thereby providing fault tolerance.

In some embodiments, the VPN endpoint virtual machines may implement a tunnel protocol that implements keys such as encryption keys and that periodically specifies that the keys should be recomputed. Foe example, the IPSec protocol includes a Phase I Diffie-Hellman key and a Phase II IPsec encryption key. Both keys are periodically recomputed, albeit at separately configurable rates. In such embodiments, the provider network may include a key store service that permits the active mode VPN endpoint virtual machine to synchronize any new key it computes with the standby mode VPN endpoint virtual machine so that the standby mode VPN endpoint virtual machine can quickly take over the role of the active mode VPN endpoint virtual machine and can thus use the most recently computed key to operate the tunnel (e.g., to encrypt packets transmitted across the tunnel).

In some embodiments, a secure tunnel can be established between two virtual private networks by way of corresponding VPN endpoint nodes attached to each respective network. More than one VPN endpoint may be attached to any one virtual private network thereby permitting virtual private network to establish a secure tunnel to multiple other virtual private networks. Various application programming interfaces (APIs) are available to permit customers of the provider network to create VPN endpoint nodes, create a VPN endpoint node using at least some of the state information of another VPN endpoint node, and attach and detach the VPN endpoint nodes to virtual private networks.

FIG. 1 illustrates a provider network 90 including one or more virtual private networks 100. Each customer of the service provider can request services executing with the provider network to launch one or more virtual machines 110 for use by the customer, which the customer can then use for any customer-desired purpose (e.g., hosting a website, batch processing, etc.). The request to launch virtual machines may be in the form of requests to application programming interfaces (APIs). A group of the customer's virtual machines may be configured to form a virtual private network 100. Each virtual machine comprises a virtualization of a physical computing device such as a server and comprises code such as an operating system, drivers, and applications that execute on a host computer.

In accordance with the disclosed embodiments, the customer can submit an API request to the provider network to create a fault tolerant VPN endpoint node 120, which the customer then can request to be attached to the customer's virtual private network 100. The customer also may use a data center 150 separate from the service provider's provider network 90. The customer can configure a remote node within his premise's data center 150 such as a gateway 152. The gateway 152 may couple to one or more servers 154 or other types of computing devices forming one or more networks within the customer' data center 150. A secure (e.g., encrypted) tunnel 123 can be established between the fault VPNe endpoint node 120 within the provider network and the remote gateway 152 over which encrypted traffic can be transmitted between the virtual private network 100 within the provider network and a network within the customer's own data center 150.

The requests to create the virtual machines 110, form the virtual private networks of virtual machines, and create the fault tolerant VPN endpoint 120 may be in the form of, for example, a request to an API that may be processed by a provisioning service executing within the provider network 90. The API request to create the VPN endpoint node 120 may be to a CreateVpnEndpoint API and may include various input parameters such as any one or more of a remote IP address, a remote pre-shared key (PSK), a tunnel inside IP classless inter-domain routing (CIDR) block of addresses, a remote Border Gateway Protocol (BGP) Autonomous System (AS) number (in embodiments in which BGP is implemented), and a local BGP AS number.

The remote IP address is the public IP address of the remote node to which the customer's fault tolerant VPN endpoint node 120 is to form a tunnel over which encrypted traffic will flow between the customer's virtual private network 100 and the network(s) in the data center 150 that are connected to gateway 152. The remote pre-shared key is a key that is preconfigured into the VPN endpoint node 120 and the gateway and is used as part of a tunneling protocol such as the IPSec protocol to authenticate each end node of the tunnel to the its peer attempting to form an IPSec tunnel. The tunnel inside IP CIDR block may comprise a plurality of IP addresses used to establish connectivity of the fault tolerant endpoint node within the provider network. One of the IP addresses in the CIDR block is the IP address of the VPN endpoint node and another IP address is the IP address of the remote node. The remote and local BGP AS numbers designate the particular autonomous systems that the fault tolerant VPNe node 120 and its remote peer counterpart should use when establishing the tunnel therebetween. The input parameters also may specify whether a fault tolerant or non-fault tolerant VPN endpoint node is to be created.

In response to receiving the CreateVpnEndpoint API request for the creation of a fault tolerant VPN endpoint node, a provisioning service within the provider network (shown in FIG. 2 and discussed below) selects multiple host computers operating within the provider network and causes a virtual machine to be launched on each such host. In one embodiment, the provisioning service selects two separate host computers on which to launch the virtual machines, although one host computer could be used to launch the two virtual machines. The virtual machines are launched by causing a particular machine image to be retrieved from machine image storage and transmitted to the selected host computer. The machine image may include an operating system, drivers, and a VPN endpoint application. The VPN endpoint application causes the virtual machine to perform the various operations needed to implement a VPN endpoint. Such operations depend on the particular protocols used to implement the VPN tunnel. In the case of using IPSec to implement the tunnel, the operations performed by the VPN endpoint application may include authenticating the remote node based on the pre-shared key, exchanging certificates, generating a Diffie-Hellman key, generating an IPSec key, negotiating security protocols and key lifetimes with the remote node, encrypting packets to be sent over the tunnel, decrypting packets received over the tunnel, renegotiating a security association (including keys), etc. The VPN endpoint applications may implement a pair of opposite direction communication paths (send and receive) to form the tunnel. If a non-fault tolerant VPN endpoint node is to be created, a single virtual machine is launched to implement the VPN endpoint node.

The machine images may be stored in a centralized database within the provider network. Each machine image, including the VPN endpoint-based images as well as other types of machine images usable by customers to launch other types of virtual machines may have pre-assigned identifiers (IDs). The IDs may be used by the provisioning service to launch a virtual machine as a VPN endpoint node. The provisioning service selects the machine image to copy to the host computer for launching the VPN endpoint virtual machine using the ID associated with the machine image needed to implement the VPN endpoint node functionality.

After the VPN endpoint-based machine images are loaded on the host computers, the provisioning service also may cause configuration parameters to be downloaded into the host computer for use by the respective virtual machine. Some of the configuration parameters may originate from the customer's initial API request for creating the VPN endpoint node, while other configuration parameters be stored in a centralized database or otherwise generated by the provisioning service or other services within the provider network. The configuration parameters may include those mentioned above such as the remote IP address, the remote pre-shared key (PSK), the tunnel inside IP CIDR, the remote BGP AS Number, and the local BGP AS Number. The collection of the configuration parameters loaded into the VPNe-based virtual machine to configure the virtual machine to be able to implement the secure tunnel to the remote node is referred to as "state information."

The customer also configures the gateway 152 with parameters it needs to help establish the secure tunnel to the VPN endpoint node 120. For example, the customer may configure the gateway with the public IP address assigned to the VPN endpoint node 120, the type of security protocol(s) supported by the VPN endpoint node (e.g., Authentication Headers (AH), Encapsulating Security Payloads (ESP), etc.), type of encryption algorithm to be used, the pre-shared key, etc.

As noted above, the provisioning service causes the VPN endpoint node to be created by launching two (or more) VPN endpoint virtual machines on one or more host computers using a suitable machine image (e.g., a machine image containing an application that implements the appropriate tunneling protocols). FIG. 1 illustrates that VPN endpoint node 120 is implemented a VPN endpoint virtual machines 122 and 125. In various embodiments, the two VPN endpoint virtual machines generally may be identical. For example, the machine images both may be booted from identical copies of a machine image. Each VPN endpoint virtual machine is selectively configurable to operate in an active mode or in a standby mode. That is, each VPN endpoint virtual machine comprising the VPN endpoint node is capable of operating in both the active and standby modes, albeit not at the same time. While one virtual machine is in the active mode, the other virtual machine is in the standby mode, and vice versa. The VPN endpoint virtual machine in the standby mode provides redundancy in the event that the active mode VPN endpoint virtual machine experiences a failure precluding it from operating correctly. As such, the VPN endpoint node 120 described herein is fault tolerant and the customer need not be involved in the implementation of the fault tolerant aspect of the VPN endpoint node 120. The customer simply requests a VPN endpoint node to be created, and the provisioning service within the provider network responds by creating two virtual machines that can implement the functionality of the VPN endpoint node with one virtual machine being a standby instance to the other. In the event the active VPN endpoint virtual machine fails (e.g., a software failure of the instance or a hardware failure of the server on which it executes), a failover mechanism automatically causes the standby mode VPN endpoint virtual machine to take over the role of the active instance and continue the operation of the secure tunnel to the remote node.

As noted above, the customer's virtual private network comprises one or more virtual machines created by or for the customer's use and execute on servers. The fault tolerant VPN endpoint 120 also is implemented as multiple (e.g., two) virtual machines executing on severs. A virtual machine is a software implementation of a physical computer system. Virtual machines may provide for multiple and/or different operating system environments to run concurrently on a single host computer 120. In one example, multiple virtual machines of a Linux® operating system environment may execute concurrently with multiple instances of a Microsoft® Windows® operating system environment on a single physical computer. A virtual machine may interact with a hypervisor or a virtual machine monitor (or other type of virtualization system) which are programs that execute on the physical computer that allow multiple guest operating systems to share a single hardware host. Each operating system appears to have exclusive access to the host's processor, memory, and other resources. However, the hypervisor controls the host processor and resources, allocating resources that are needed to each instance's operating system in turn and making sure that the guest operating systems of the virtual machines do not disrupt each other. Each virtual machine may be controlled by a respective customer.

The virtual machines created by the customer to form the overlay network can be loaded by the customer with whatever customer-specific applications the customer so chooses. For example, the customer's applications may comprise web server applications, data processing applications, or any other type of functionality that the customer desires. The applications executing within the VPN endpoint virtual machines may be pre-stored in the machine images used to boot such virtual machines or may be loaded into the virtual machines post-boot by the provisioning service.

A VPN endpoint 120 created by the provisioning service may be attached, at the request of the customer (e.g., via a request submitted to an API), to the customer's virtual network, although the VPN endpoints 120 can be attached to other types of networks as well (e.g., a group of virtual machines that do not form a virtual private network. Each virtual network for a customer may be implemented over one or more intermediate physical networks that interconnect computing nodes on which the customer's virtual machines execute. That is, a virtual network may be implemented over a physical network. Each customer may have their instances in a virtual network. A virtual network uses virtual IP addresses and corresponding physical IP addresses. The implementation of a virtual network may include modifying or adding additional headers to packets to map virtual addresses consistent with the virtual network to physical addresses associated with the underlying physical network so that the packets can be routed through the physical network between host computers. A mapping service may be provided to store, update and provide virtual-to-physical address mappings for use in modifying packets to be transmitted between virtual machines in a virtual private network.

The virtual network may be implemented in various ways in various embodiments, such as by using IPv4 ("Internet Protocol version 4") or IPv6 ("Internet Protocol version 6") packets as the overlay network packet size. For example, virtual network address information for a virtual network could be embedded in a larger physical packet network address space used for a networking protocol of the one or more intermediate physical networks. As one illustrative example, a virtual network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions, or otherwise modifying such data transmissions to translate them from a first networking protocol for which they are configured to a distinct second networking protocol. In other embodiments IPv4 packets could be used by the physical network and the virtual network. For example, the size of the IPv4 packet generated by the virtual machine could be limited to a size that can be inserted into an IPv4 packet and leave enough bits so the service provider can add headers to the packet.

Referring still to FIG. 1, both the active mode and the standby mode VPN endpoint virtual machines 122 and 125 have access to a shared key storage 128. The shared key storage 128 is used by the VPN endpoint virtual machines 122 and 125 to exchange the keys used to implement the tunnel 123. In the event that the active mode VPN endpoint virtual machine 122 fails, the standby VPN endpoint virtual machine 125, which already has the relevant key(s), can quickly take over role as the active VPN endpoint virtual machine. The key exchange process is described below in greater detail.

Figure 2:
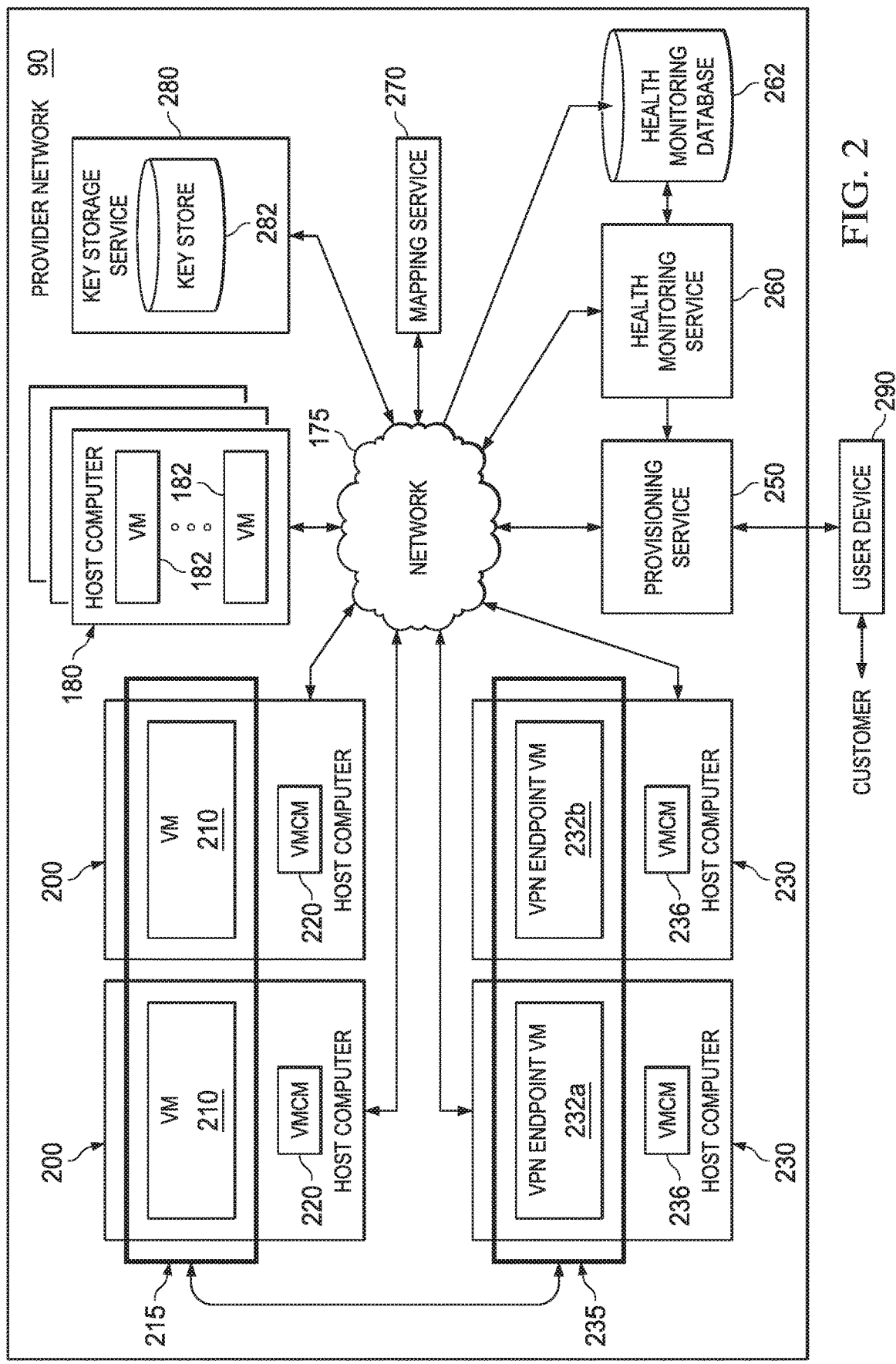
FIG. 2 shows an implementation of a provider network in accordance with various examples.

FIG. 2 shows another embodiment of the provider network 90. In this embodiment, the provider network includes multiple host computers such as host computers 180, 200, and 230 (which may implemented a servers) coupled via a network 175. The network 175 comprises multiple routers and switches that provide connectivity between the various computing and storage devices within the provider network. Host computers 180 can be used to launch virtual machines 182 for customers to use as the customers see fit as noted above. Customers can interact via their own user devices 290 with a provisioning service 250 to request the creation of one or more virtual machines 182. A user device 290 may comprise any type of computing device such as personal computer, a smart phone, a tablet device, etc. Through the user device 290, a customer can submit requests to the provisioning service for various services such as virtual machine creation, VPN endpoint node creation, virtual machine termination, virtual network creation, etc. The customer may submit API requests via a command line interface (CLI) or a script file, or both. Alternatively, or additionally, a web browser may execute on the user device 290 and the customer may interact with the provisioning service 250 via the web browser. The provisioning service 250 may be implemented a number of constituent services. One such service may be a user interface which generates hypertext markup language (HTML) web pages which are transmitted across a public network (not shown) such as the Internet to the user device for display thereon. The web browser may display a console interface by which the customer can interact. The provisioning service may receive and process API requests from the customers of the service provider and perform the operations indicated by the API requests. For example, the provisioning service may perform a workflow to launch virtual machines on host computers, launch the fault tolerant VPNe virtual machines described herein, etc.

FIG. 2 shows an example of host computers 200 being used to execute virtual machines 210, as well as a fault tolerant VPN endpoint node 235 implemented on host computers 230. The VPN endpoint node 235 is implemented as VPN endpoint virtual machines 232a and 232b executed on the host computers 230. The customer in this example also has requested, for example via additional API requests, that his virtual machines 210 be formed into a virtual private network 215 (or the formation of the virtual private network 215 may have been part of the launch request to launch the virtual machines 210 in the first place) and that the VPN endpoint node be connected to the customer's virtual private network 215. The provisioning service 250 can launch virtual machines 182, 210 and 232a and 232b on the various host computers as shown.

Each of the VPN endpoint virtual machines 232*a*, 232 is capable of being configured to be in an active mode or in a standby mode. The application executing with the virtual machines 232*a*, 232*b* may include a configuration mode setting that can be set by an external agent such as the provisioning service. In some examples, the provisioning service 250 may send a signal such as packet to a VPN endpoint virtual machine 232*a*, 232*b* to configure it for active mode operation or standby mode operation. The provisioning service 250 configures one of the virtual machines for the active mode of operation and the other virtual machine for the standby mode of operation. Thus, one of VPN endpoint virtual machines 232*a*, 232*b* is an active mode VPN endpoint virtual machine and other is a standby mode VPN endpoint virtual machine, and the provisioning service can reconfigure the standby mode VPN endpoint virtual machine to the active mode upon detection of a failure of the active mode VPN endpoint virtual machine.

The host computers within the provider network can exchange packets across network 175 using IP addresses of the host computers ("physical" IP addresses). A virtual private network, however, as explained above is one in which the member virtual machines use a different set of addresses ("virtual" IP addresses). In accordance with some embodiments, one or more of the computers may include a virtual machine communication manager (VMCM) usable for the implementation of the virtual private networks. Host computers 200 and 230, for example, include VMCMs 220 and 230. The VMCMs 220 and 230 may modify (as described above) an outgoing packet destined for a virtual IP address of another virtual machine within the customer's virtual private network based on the physical IP addresses used within provider network. For example, if a communication packet is to be sent between computing nodes in the service provider's network, the originating packet may include an IP address in accordance with a particular protocol (e.g., IPv4), and a VMCM associated with the sending host computer embeds the virtual network packet into a substrate network packet which includes physical source and destination IP addresses. The VMCM then transmits the packet through the interconnection network 175. A VMCM associated with the receiving host computer receives the substrate packet, extracts the virtual network packet and forwards the virtual network packet on to the targeted virtual machine. A mapping service 270 is shown in FIG. 2 and may store mappings between virtual and physical IP addresses. Such mappings may be transmitted when needed to a particular VMCM 220, 236 to send and receive packets within a given virtual private network.

The provider network 90 in FIG. 2 also includes a health monitoring service 260 and a health monitoring database 262. The health monitoring service may comprise machine instructions that execute on a server computer and the health monitoring database may be stored in a storage device such as hard drive, solid state storage, etc. The health monitoring service and database can be used to monitor the health and status of the VPN endpoint virtual machines 232*a*, 232*b* and the host computers on which they execute, as well other virtual machines and computing devices within the provider network. In some embodiments, each VPN endpoint virtual machine sends a heartbeat message at periodic or near-periodic intervals. Each heartbeat message may encode health and/or status information about the corresponding virtual machine. The fact that a heartbeat message was sent at all indicates something about the operational nature of the virtual machine. Failure to transmit a heartbeat message may be indicative of a failure of the virtual machine or other components within the host computer on which the virtual machine executes. The health and status information contained within the heartbeat messages may include any of a variety of information such as error codes indicative of any errors detected internal to the virtual machine such as memory errors, network port timeouts, etc., processor utilization rates, memory utilization rates, etc. The health and status information may contain no information about any problems and thus include values or metadata indicative of a healthy and fully operational virtual machine. In some examples, the health and status information may include a healthy/unhealthy indicator for each of multiple subsystems within the virtual machine and corresponding virtualization system.

Each of the VPN endpoint virtual machines 232*a*, 232*b* sends the heartbeat messages to the health monitoring database 262 for storage therein. The health monitoring database 262 thus may store health and status messages and information for multiple VPN endpoint virtual machines. Each such virtual machine has an ID and the heartbeat messages may include the ID of the respective virtual machine. The health monitoring service 260 can access the health monitoring database 262 and determine the health and status of a given VPN endpoint virtual machine. As such, the health monitoring service 260 can determine whether an active mode VPN endpoint virtual machine has failed and, as explained below, if the active mode VPN endpoint virtual machine is determined to be experiencing a failure, initiate a fail-over process to the standby VPN endpoint virtual machine.

Referring still to FIG. 2, the provider network 90 also includes a key storage service 280 which contains or otherwise has access to a key store 282. The key storage service 280 is accessible the VPN endpoint virtual machines 232*a*, 232 during a rekeying operation that may be part of the protocol that implements the tunnel to the remote node (e.g., tunnel 123 in FIG. 1). The key store 282 comprises storage that can be shared exclusively by an active/standby pair of VPN endpoint virtual machines. The keys stored in the key storage may be encrypted. The use of the key storage service 280 by a given active/standby pair of VPN endpoint virtual machines is described in detail below.

Figure 3:
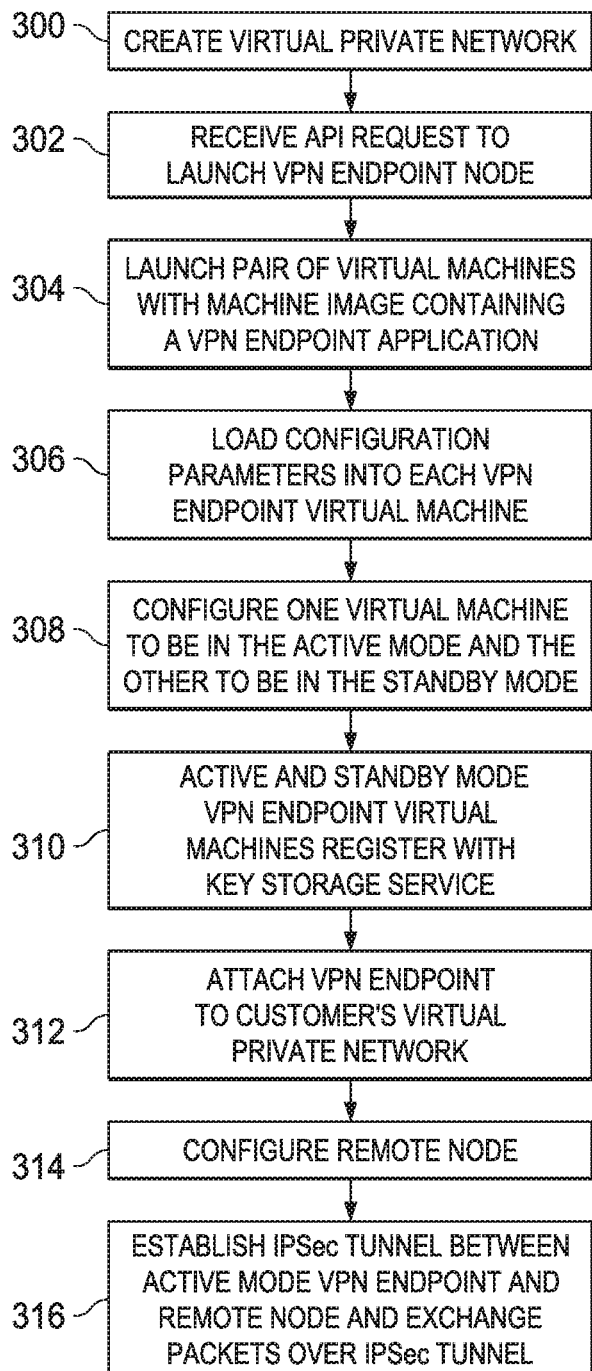
FIG. 3 shows a method in accordance with various examples.

FIG. 3 illustrates a method in accordance with various embodiments. The operations may be performed in the order shown, or in a different order. Further, two or more of the operations may be performed concurrently instead of sequentially. At 300, the method includes creating a virtual private network. This operation may be performed in response to receipt from a customer of API requests to create multiple virtual machines and then implement a virtual network from a given set of the customer's virtual machines. The provisioning service 250 may implement this operation by causing machine images to be loaded onto host computers, cause virtual machines to be booted based on the machine images, configure the virtual machines with IP addresses, etc. The customer can specify, via an API request, which virtual IP addresses are to be used for the individual virtual machines within the virtual private network and the corresponding mappings between virtual and physical IP addresses may be added to a database within the mapping service 270.

At 302, the method may include receiving an API request to launch a VPN endpoint node. The API request may be initiated by a customer from a user device 290 as described above. The API request may be to the CreateVpnEndpoint API as noted above and include the various input parameters explained previously (IP address of remote node, pre-shared key, etc.). The API request may be received and processed by the provisioning service 250. In response to receipt of the CreateVpnEndpoint API request, the provisioning service at 304 causes a pair (or more than two) of virtual machines to be launched from a machine image containing a VPN endpoint application. A repository (not specifically shown) containing machine images may be accessed by the provisioning service. The provisioning service may be configured to use a particular machine image (with a particular ID) when attempting to launch a VPN endpoint virtual machine. The provisioning service 250 may select a host computer and send a packet to that computer with the ID of the targeted machine image. The host computer then may obtain the machine image itself form the centralized storage. In other embodiments, the provisioning service may send a message to the repository containing the targeted machine image and request a copy to be transmitted to a specific host computer. Regardless of the mechanism implemented to place the desired machine image on the selected host computer, the machine image containing the VPN endpoint application is stored in a storage device (magnetic hard drive, solid state storage, etc.) of the host computer.

At 306, the method includes transmitting to, and loading configuration parameters within, each VPN endpoint virtual machine. Examples of the configuration parameters are provided above and include the IP address of the remote node to which the tunnel is to be established, the remote pre-shared key, the BPG AS numbers, etc. The provisioning service, or another service within the provider network, may transmit the configuration parameters to each VPN endpoint virtual machine.

Once the VPN endpoint virtual machines are launched and operational, an ID may be generated by the provisioning service 250 for the VPN endpoint node (i.e., the pair of VPN endpoint virtual machines). As the customer need not be aware of the existence of the fact that two VPN endpoint virtual machines have been created in response to the customer's request, the ID that is generated and assigned is applicable to the collective pair of virtual machines. Thus, the customer need only refer to the VPN endpoint node by the one VPN endpoint ID.

At 308, the method includes configuring one of the virtual machines launched at 304 to be in the active mode (e.g., through assignment to that virtual machine of a public IP address) and the other virtual machine to be in the standby mode (e.g., through no assignment of a public IP address). Selection of the virtual machine to be in the active mode may comprise a random selection by the provisioning service between the two virtual machines, selection by the provisioning service of the virtual machine that first acknowledges that it has completed the boot process back to the provisioning service, or any other methodology for selecting one of the two virtual machines. Configuring each virtual machine to be in either the active or standby mode may comprise transmission by, for example the provisioning service, of a message that indicates whether the receiving virtual machine is to be in the active mode or in the standby mode. Each VPN endpoint virtual machine may contain a storage element (memory, register, etc.). The message from the provisioning service that indicates whether each virtual machine is to be in the active or standby mode contains a mode indicator (active versus standby) which may be stored in the storage element, and then read by the application software within the virtual machine to set its mode.

In other embodiments, the two virtual machines may negotiate between themselves as to which one of them is to be in the active mode, and then once they decide amongst themselves which virtual machine is to be the active mode virtual machine and which is to be the standby mode virtual machine, transmit messages to the provisioning service 250 as to their determined operational modes (i.e., messages that indicate to the provisioning service which VPN endpoint virtual machine is in the active mode and which is in the standby mode). The inter-VPN endpoint virtual machine negotiation may include each of the virtual machines generating a value such as a random number and transmitting a packet with its value to the other virtual machine. The VPN endpoint virtual machine having the higher value (or lower value) is the VPN endpoint virtual machine that is to transition to the active mode, while the other VPN endpoint virtual machine transitions to the standby mode. The virtual machines may inform the provisioning service as to the results of the negotiation and the provisioning service may confirm the results by transmitting back to each VPN endpoint virtual machine a packet containing its corresponding mode value (active versus standby).

At 310, the method includes the active and standby mode virtual machines registering with the key storage service 280. The registration process may include each virtual machine submitting an API call to the key storage service that the virtual machine (e.g., standby virtual machine) is to receive notification of a change in a key of the other virtual machine (e.g., the active virtual machine). As a result, when the active virtual machine changes a key it uses for the tunnel to the remote node, it publishes its newly computed key to the key storage service and the key storage service informs the standby virtual machine of the key change. In other embodiments, the provisioning service may transmit one or more messages to the key storage service 280 with the corresponding identifiers. The identifiers may comprise, for example, IP addresses of the corresponding virtual machines, and an explicit or implicit mapping between the identifiers which indicates that the VPN endpoint virtual machines associated with those identifiers are counterparts of an active/standby pair of VPN endpoint virtual machines which collectively form a single VPN endpoint node. In some embodiments, both identifiers may be provided in a single message to the key storage service which implicitly maps together the two VPN endpoint virtual machines. In other embodiments, the message sent to the key storage service 280 may contain an explicit indicator that the virtual machines are related as active and standby counterparts.

At 312, a customer may request that the VPN endpoint node (which comprises an active mode VPN endpoint virtual machine and a standby mode VPN endpoint virtual machine) is to be attached to the virtual private network created at 300. The customer may submit a request to an API (for example called an AttachVpnEndpoint API to request the attachment. The API request may be initiated via the customer's user device 290 and may include, as an input parameter, the VPN endpoint ID noted above, as well as other values as desired such as the ID of the customer's virtual private network created at 300, a subnet identifier value, etc. In response to this API request, the provisioning service 250 may update routing tables within the customer's virtual private network to indicate which packets are to be sent to the newly created VPN endpoint node for transmission across the tunnel.

At 314, the remote node to which the VPN endpoint node is to be communicatively coupled via a tunnel is configured. The remote node may be a computing device (e.g., a server configured as a gateway such as gateway 152 in FIG. 1) owned and/or operated by the customer and outside the control of the provider network. In such instances, the customer configures his remote node based on the configuration of his VPN endpoint node. In some embodiments, the customer can submit a DescribeVpnEndpoint API request which may be processed by the provisioning or other service executed within the provider network to return configuration data to the customer pertaining to the VPN endpoint node. Such configuration data may include the IP address assigned by the provider network to the VPN endpoint node, the remote node's IP address, the local BGP AS number, the remote BGP AS number, the tunnel IP CIDR block address, etc. The customer configures his remote node to implement the same security protocols as the VPN endpoint node. Such security protocols may be published or otherwise specified to the customer by the service provider. In some implementations, the customer may have some control over which security protocols are implemented by his VPN endpoint node and such security protocols may be included in the CreateVpnEndpoint API request at operation 302. The customer also may specify the IP address associated with the VPN endpoint node implemented in the provider network. The IP address may be returned in response to the DescribeVpnEndpoint API request.

In some cases, the customer may want to establish a tunnel between a pair of virtual private networks within the provider network 90. The virtual private networks are communicatively coupled by way of a VPN endpoint node attached to each virtual private network. One virtual private network and its VPN endpoint node are created via operations 300-308. A second virtual private network may be created as described above in operation 300. A VPN endpoint node may be created for the second virtual private network in response to, for example, a request to a CreateVpnEndpointPeer API. The input parameter to this request may include the VPN endpoint node ID assigned to the VPN endpoint node created in operations 302-308. This API request causes the provisioning service 250 to create a VPN endpoint node implemented as a pair of active/standby mode VPN endpoint virtual machines in much the same way as described above. The VPN endpoint virtual machine created in response to the CreateVpnEndpointPeer API request obtains its state for the connection from the previously created VPN endpoint virtual machine. Such state information may include the security protocols, preshared key, encryption algorithms, etc.

At this point, the customer has created the VPN endpoint node (which the provider network has implemented an active/standby mode pair of VPN endpoint virtual machines) as well as the remote node, and the remote node may be another provider network-hosted VPN endpoint node or a customer computing device external to the provider network (e.g., a gateway). At 316, the method includes establishing a tunnel between the active mode VPN endpoint node and the remote node and then using the tunnel to exchange packets. As noted above, the tunnel may be implemented according to the IPSec protocols and the packets exchanged over the IPSec tunnel may be encrypted using IPSec keys generated during the tunnel formation process. For example, to implement an IPSec-based tunnel, the peered VPN endpoint nodes perform a Phase I and a Phase II negotiation process. During Phase I, the VPN endpoint nodes authenticate each other using, for example, the preshared key. Each VPN endpoint node may compute a hash of its copy of the preshared key (or a set of data that includes the preshared key) and transmits the resulting hash value to the peer VPN endpoint node. The receiving VPN endpoint node also computes the hash of its preshared key. Both VPN endpoint nodes authenticate each other upon determining that the hash values match. Phase I also includes the computation of a Diffie-Hellman key, which is then used during Phase II to compute an IPSec key. The IPSec key is the key that is actually used to encrypt packets transmitted across the tunnel. In accordance with the implemented tunnel protocol (e.g., IPSec), the Phase I (Diffie-Hellman) key and the Phase II key (IPSec key) may be recomputed from time to time. The frequency with which the keys are recomputed is configurable and the Phase I key may be computed at a different frequency (e.g., once per day) than the Phase II key (e.g., once per hour). A synchronization process of the keys between the active mode VPN endpoint virtual machine and its standby mode counterpart helps to ensure that the standby mode VPN endpoint virtual machine can take over the role of the active mode VPN endpoint virtual machine if a failure of the active mode VPN endpoint virtual machine is detected. Examples of the key synchronization process are described below.

Figure 4:
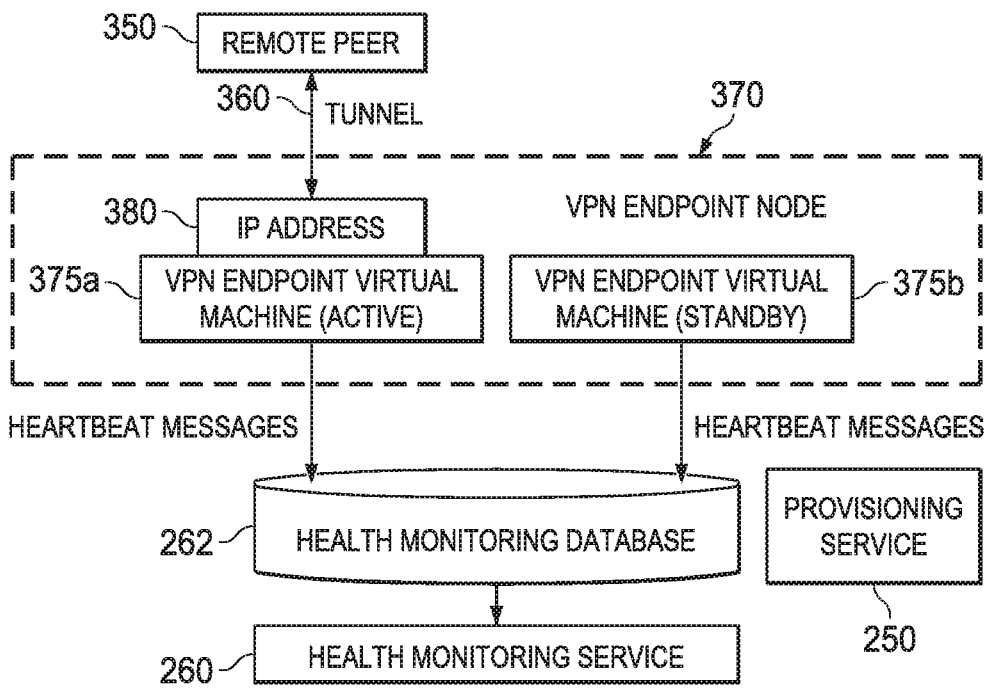
FIG. 4 shows an example of an implementation of a fault tolerant VPN endpoint node that submits heartbeat messages for analysis by a health monitoring service in accordance with various embodiments.

FIG. 4 illustrates an embodiment of the system in which the health and status of the VPN endpoint virtual machines are monitored. A VPN endpoint node 370 is shown comprising a pair of VPN endpoint virtual machines 375a and 375b. VPN endpoint virtual machine 375a is currently operating in the active mode and VPN endpoint virtual machine 37b is currently operating in the standby mode. A tunnel has been established between the VPN endpoint virtual machine 375a and a remote peer node 350. An IP address 380 has been assigned to the VPN endpoint virtual machine 375a and is used in the packets created and exchanged across tunnel between the VPN endpoint virtual machine 375a and the remote peer 350. The IP address 380 is a public IP address that nodes external to the provider network use to access the VPN endpoint virtual machine. The IP address 380 may be an elastic IP address meaning that the IP address remains associated with the customer's service provider account and, in the event the virtual machine to which the IP address is presently assigned fails, the IP address can be reassociated with another virtual machine. IP address 380 may mapped by a network address translator (NAT) to a private IP address within the provider network which is associated with the host computer on which the corresponding VPN endpoint virtual machine is executed. The NAT may maintain a set of public-to-private IP address mappings.

Each VPN endpoint virtual machine 375a, 375b sends heartbeat messages to the health monitoring database 262. The messages may indicate the operational state of the virtual machine such as explained above. The heartbeat messages are stored in the health monitoring database for each of the VPN endpoint virtual machines. The health monitoring service 260 can access the heartbeat messages (or lack thereof) of each of the VPN endpoint virtual machines from the database 262 to determine whether each of the VPN endpoint virtual machines are fully operational or have experienced a failure of some type.

Figure 5:
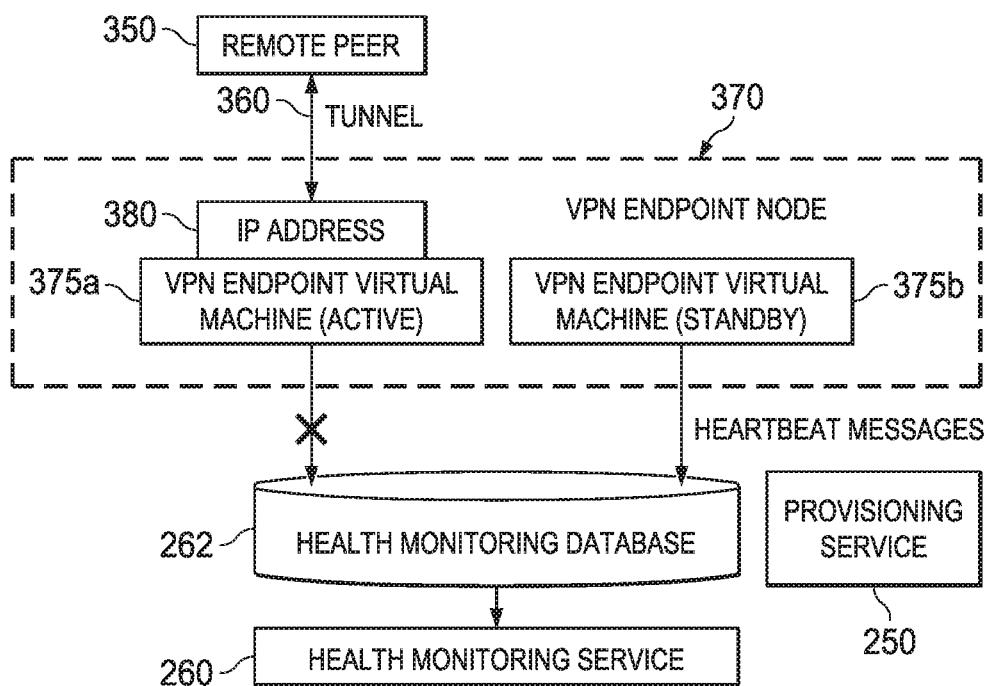
FIGS. 5-9 illustrate the detection of a failure of an active mode VPN endpoint virtual machine and fail-over to a standby VPN endpoint virtual machine in accordance with various embodiments.

FIG. 5 illustrates that the VPN endpoint virtual machine 375a currently the active mode and transacting traffic across the tunnel 360 has experienced a failure, as indicated by the "X". The failure may be encoded in one or more heartbeat messages transmitted from the VPN endpoint virtual machine 375a and stored in the health monitoring database 262, or the failure may prevent the VPN endpoint virtual machine 375a from sending heartbeat messages altogether (or at a rate that is outside a range of expected heartbeat message updates). The health monitoring service 260 accesses the database and determines based on the messages or lack thereof that the VPN endpoint virtual machine 375*a* has experienced a failure. The health monitoring service 260 may check the content of the health monitoring database 262 for each VPN endpoint virtual machines at any suitable rate such as once every 10 seconds, once per minute, once per hour, etc.

Figure 6:
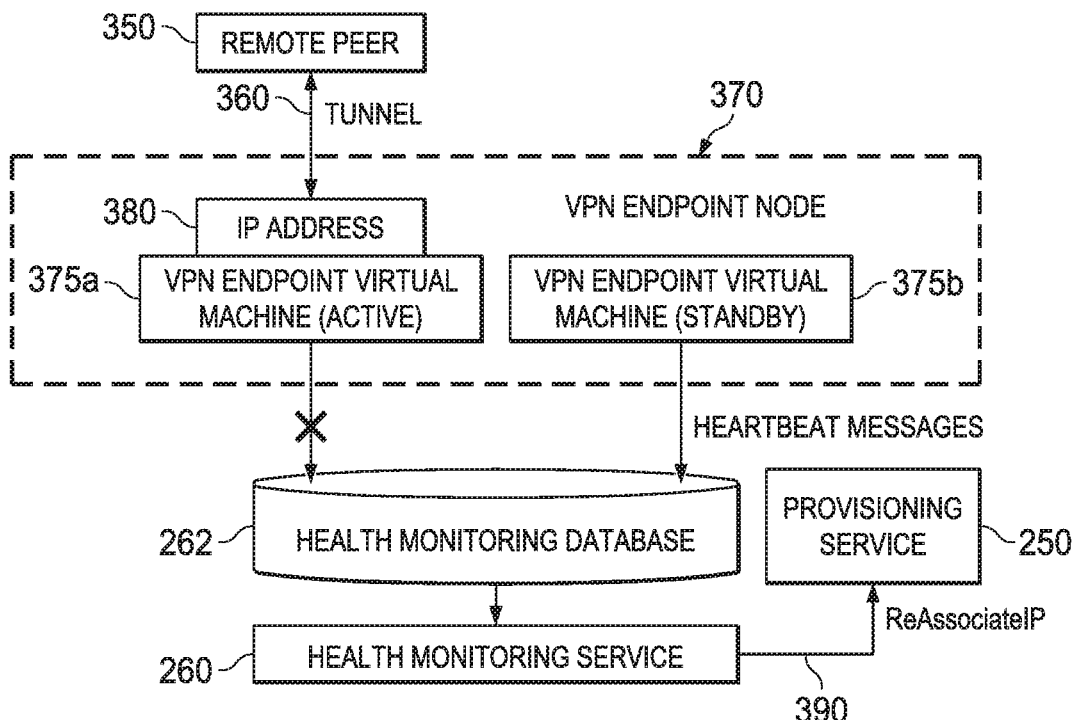

In response to the detection of a failure with the VPN endpoint virtual machine 375*a* currently operating in the active mode, the health monitoring service may initiate a fail-over to the currently standby mode VPN endpoint virtual machine 375*b*. This process is illustrated in FIGS. 6-9. In FIG. 6, the health monitoring service 390 may send a ReAssociateIP API request message to the provisioning service 250. The IP address 380 may be a public IP address as noted above. The ReAssociateIP API request message may include as input parameters the IP address to be reassociated (e.g., IP address 380), an identifier (e.g., private IP addresses) of the host computer that hosts the failed VPN endpoint virtual machine to which the IP address 380 is currently associated, and the IP address of the host computer that hosts the standby VPN endpoint virtual machine to which the IP address 380 is to be re-associated. Address mappings containing IP address 380, such as address mappings in a network address translator that maps the public IP address to a private address of a provider network host computer, are updated by the provisioning service 250.

Figure 7:
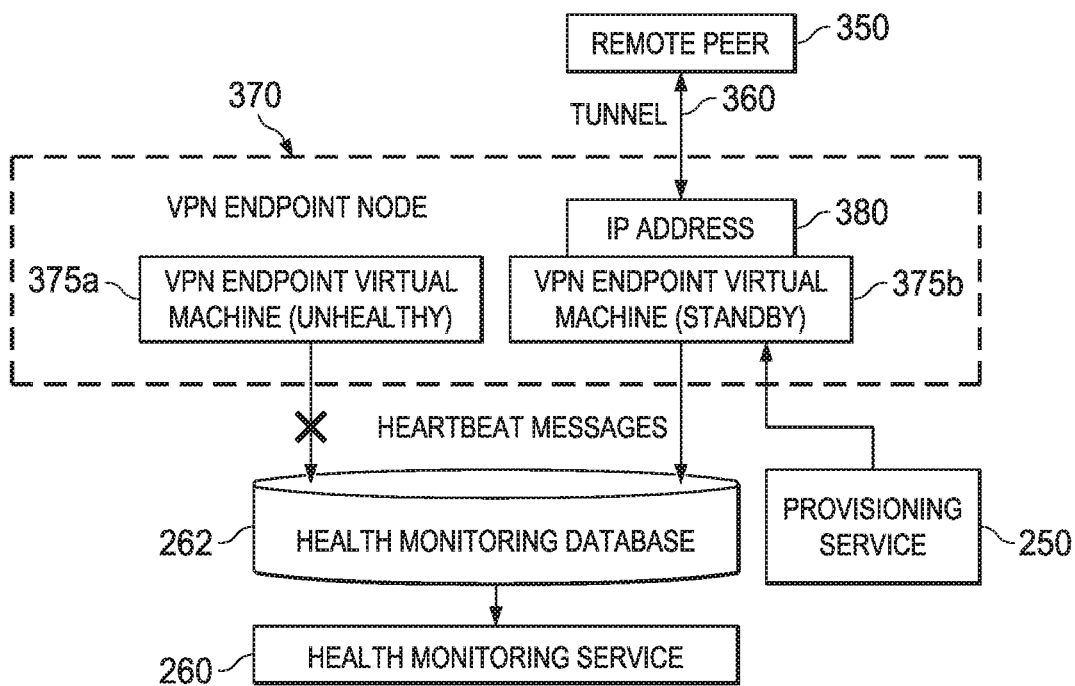

As a result of the IP address mapping updates, the IP address 380 is re-assigned to the VPN endpoint virtual machine 375*b* as illustrated in FIG. 7. As a result of re-assigning the IP address 380 for the tunnel 360, the tunnel effectively is moved to the VPN endpoint virtual machine 375*b*. FIG. 7 also illustrates the VPN endpoint virtual machine 375*a* is marked as "unhealthy". This designation may be implemented by the health monitoring service 260 changing a state designation for that virtual machine in a database, such as the health monitoring database 262.

Figure 8:
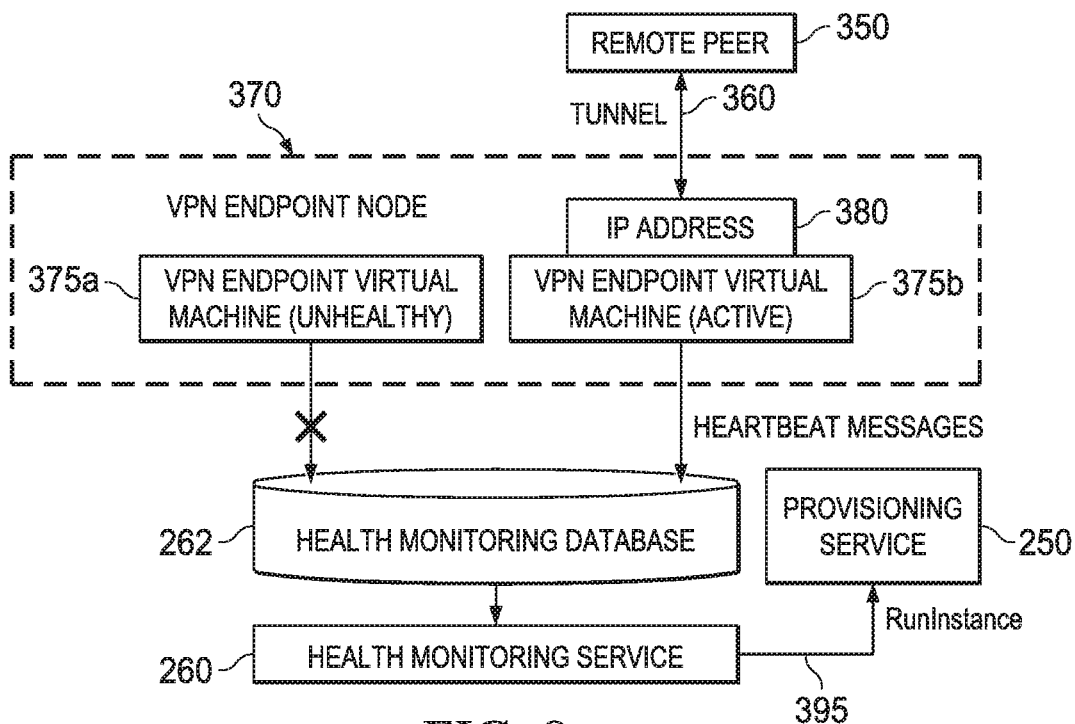
Figure 9:
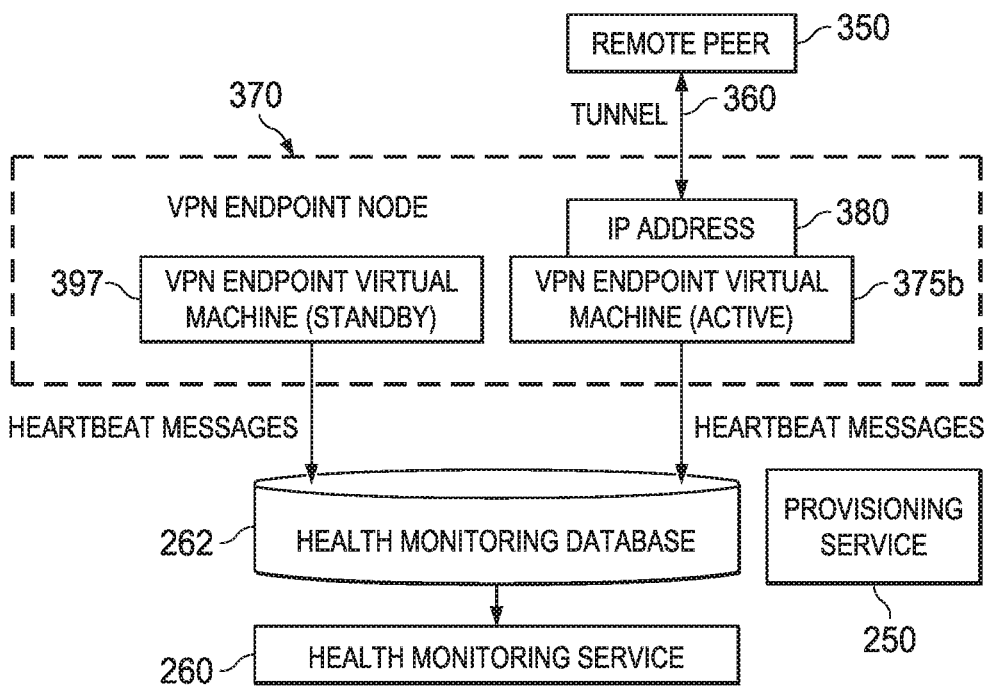

At this point, the VPN endpoint node, which previously comprised an active virtual machine and standby virtual machine, now only comprises a single active virtual machine (virtual machine 375*b*, whose mode designation is shown in FIG. 8 as active instead of standby). The former active mode VPN endpoint virtual machine 375*a* has experienced a failure and is presumably incapable of adequately functioning to configure and operate the tunnel 360 to the remote peer 350. Thus, the VPN endpoint node is no longer fault tolerant. However, the health monitoring service 260 may submit a RunInstance API call to the provisioning service 250 to request a new virtual machine to be launched on a host computer to function as a standby VPN endpoint virtual machine. FIG. 9 illustrates the inclusion of a new VPN endpoint virtual machine 397 which has been launched as part of the VPN endpoint node. This virtual machine may be launched using the same machine image that was used to launch the original pair of virtual machines 375*a* and 375*b*, and thus may contain the appropriate software capable of performing the functions of a VPN endpoint in the event active mode VPN endpoint 375*b* experiences a failure. At this point, the VPN endpoint is again fault tolerant.

Figure 10:
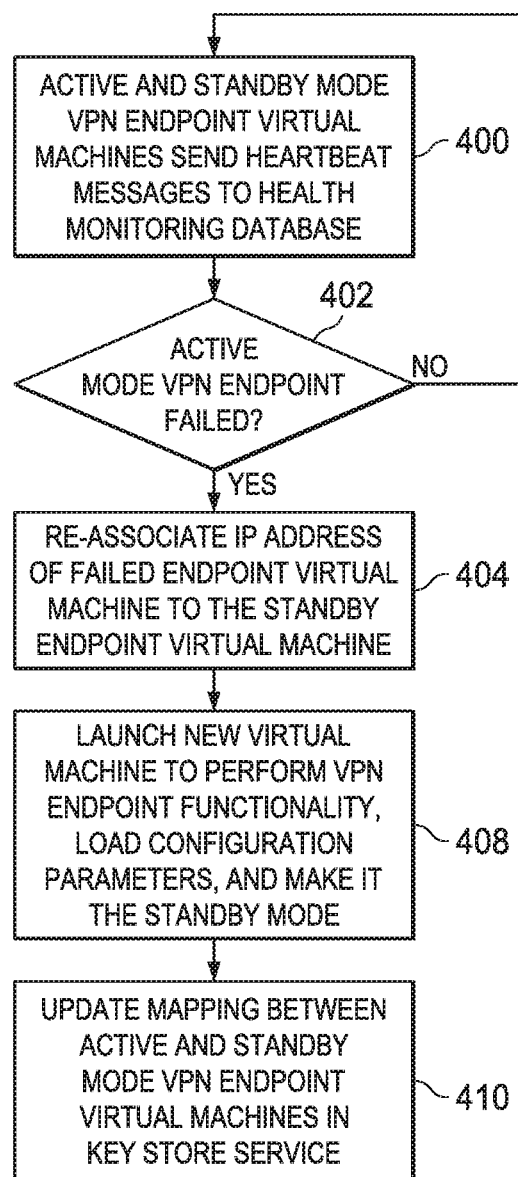
FIG. 10 shows a method for detection of a failed active mode VPN endpoint virtual machine, fail-over to the standby mode VPN endpoint virtual machine, and replacement of the failed active mode VPN endpoint virtual machine with a new virtual machine.

FIG. 10 shows a method for failing over from a failed active mode VPN endpoint virtual machine to its standby counterpart in accordance with various embodiments. The operations may be performed in the order shown, or in a different order. Further, two or more of the operations may be performed concurrently instead of sequentially. At 400, the method includes the active and standby mode VPN endpoint virtual machines sending heartbeat messages to the health monitoring service 260 as explained above.

At 402, the health monitoring service 260 determines whether the active mode VPN endpoint virtual machine has failed by, for example, analyzing the heartbeat message data stored in the health monitoring database 262. If no failure is detected of the active mode VPN endpoint virtual machine, then control loops back to operation 400 at which the virtual machines continue to send heart beat messages. The health monitoring service 260 also may monitor the health and status of the standby mode VPN endpoint virtual machine. Although the standby mode VPN endpoint virtual machine is not presently actively involved in the operation of the tunnel to the remote node, it may be desirable to know whether the standby virtual machine is fully operational. If it is not fully operational, the VPN endpoint node is not fault tolerant and corrective action may be taken. Such corrective action may include launching a replacement virtual machine to function as the standby VPN endpoint virtual machine.

At any rate, if the active VPN endpoint virtual machine is determined by the health monitoring service 260 to be experiencing a type of failure that renders it incapable of adequately functioning as a VPN endpoint, then control continues at operation 404 in which the method includes re-associating, as explained above, the IP address of the failed VPN endpoint virtual machine to the standby mode VPN endpoint virtual machine. Re-associating the IP address to the former standby mode VPN endpoint virtual machine causes the standby mode VPN endpoint virtual machine to operate as the active mode VPN endpoint virtual machine.

At 408, the provisioning service, as requested by health monitoring system 260, may cause a new virtual machine instance to be launched on a host computer to replace the failed virtual machine. In some embodiments, the new virtual machine is launched using the same machine image used to launch the original machine images forming the VPN endpoint node. The newly launched virtual machine may be launched in the same or different physical or virtual data center as the failed virtual machine. The newly launched virtual machine is configured to operate in the standby mode and configuration parameters are transmitted to the new virtual machine that the instance would need to operate as VPN endpoint should it be needed to operate in the active mode. The configuration parameters may be the parameters discussed previously such as the pre-shared key, the CIDR block addresses, the security protocols, etc. associated with the customer's VPN endpoint, which have been stored as previously explained.

At 410, the method also may include updating the mapping between the active mode VPN endpoint virtual machine and the newly launched standby mode VPN endpoint virtual machine in the key storage service's database. In some embodiments, the newly launched virtual machine subscribes itself with the key storage service to receive any key updates generated by the newly activated virtual machine by supplying, for example, the IP address or other identifying value of the active mode VPN endpoint virtual machine instance. The mappings may include the IDs assigned to the virtual machines forming the VPN endpoint, the IP addresses of the host computers on which they operate, and/or any other values that uniquely identify the particular virtual machines forming the VPN endpoint node. As explained below, the key storage service is used to synchronize, between the active and standby mode VPN endpoint virtual machines, the keys (e.g., Phase I Diffie-Hellman key, Phase II IPSec key, etc.) used to implement the tunnel. The provisioning service 250 may transmit one or more messages to the key storage service to update the mapping when one of the virtual machines providing fault tolerance for the VPN endpoint node fails and is replaced with a new virtual machine.

In some embodiments, the active and standby mode VPN endpoint virtual machine instances are launched from VPN endpoint-specific machine images as noted above. If a software upgrade (e.g., enhanced features, security patches, etc.) is made the machine image used to launch VPN endpoint virtual machines, a new pair of virtual machines images can be launched using the new machine image and a change-over from the currently executing active and standby mode VPN endpoint virtual machine instances can be performed. For example, a pair of new virtual machine instances can be launched from the newly patched machine image. Once the new virtual machines have been launched, the provisioning service 250 can initiate a failover process for each of the current active and standby mode VPN endpoint virtual machine instances to one of the newly launched virtual machines. The failover process may include re-associating the IP address from the active mode VPN endpoint virtual machine instance to one of the newly launched virtual machine instances that is to operate in the active mode, as well as copying all other relevant state information to the new virtual machines (e.g., encryption keys, encryption protocols, IP address of remote peer, etc.).

Figure 11:
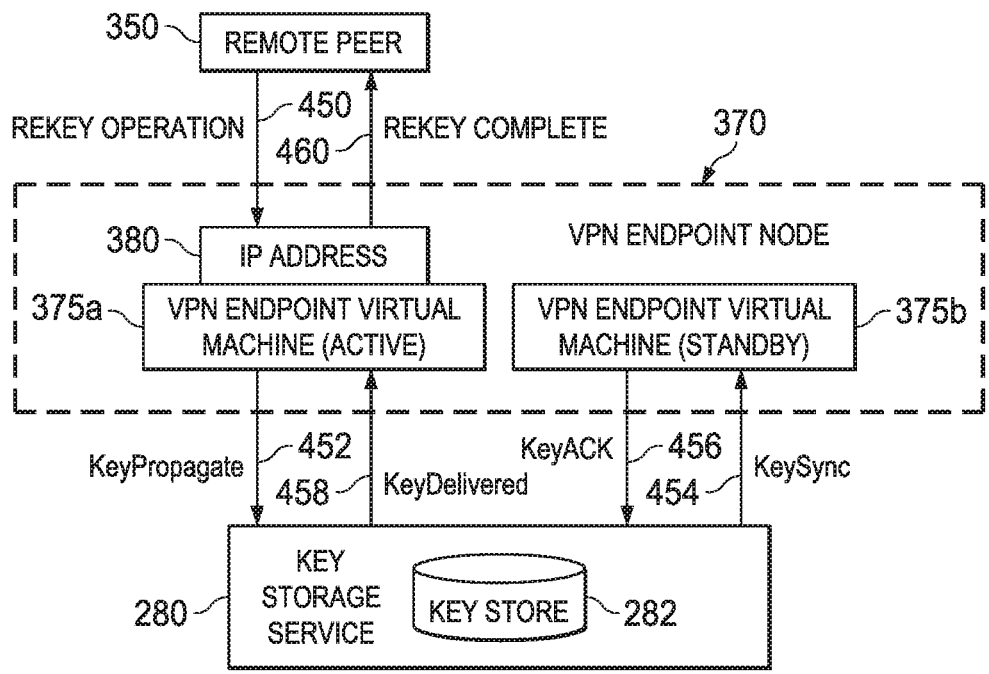
FIG. 11 shows an embodiment of a synchronization process for synchronizing a newly computed key between the active and standby mode VPN endpoint virtual machines.
Figure 12:
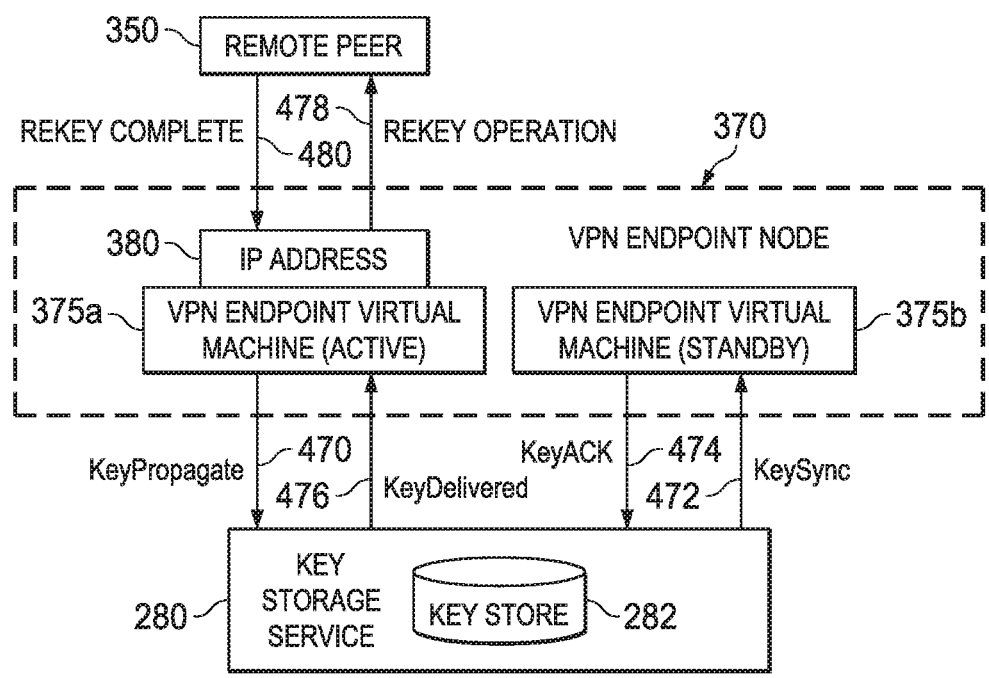
FIG. 12 shows another embodiment of a key synchronization process.

FIGS. 11 and 12 illustrate the operation of the key synchronization process. The keys generated in FIGS. 11 and 12 may be keys used to implement the tunnel between the active mode VPN endpoint virtual machine of the customer's VPN endpoint node and a remote node (which may be another VPN endpoint node within the same or different provider network or a gateway within the customer's premises. In some embodiments, the tunnel is an IPSec tunnel and thus the keys may the Diffie-Hellman key generated during Phase I or the IPSec key generated during Phase II. The Diffie-Hellman and IPSec keys may be generated periodically. For example, the Diffie-Hellman keys may be re-computed every 8 hours, once per day, etc., while the IPSec keys may be re-computed more frequently such as once per hour. In some embodiments, the key synchronization process described in FIGS. 11 and 12 may include sequence numbers that are used during the key regeneration process over the tunnel.

In FIG. 11, a rekey operation 450 is initiated between the remote peer 350 and the active mode VPN endpoint virtual machine 375a. The rekey operation 450 includes performing one or more steps in accordance with the applicable rekeying protocol. The IPSec protocol includes a series of steps for computing Diffie-Hellman keys and a different series of steps for computing IPSec keys. Other tunnel-based protocols have different methods for rekey operations. Operation 450 is indicative of all of the series of steps to perform the applicable rekey operation. For example, some of the steps to compute a Diffie-Hellman key may comprise each side of the tunnel (remote peer and active mode VPN endpoint virtual machine) to exchange information as to encryption methods and algorithms each side supports, compute a private key from a pool of random bits, compute a public key from the private key, exchange the public key with the other side, and compute the Diffie-Hellman key from their own private key and the other side's public key. Some of the steps to compute an IPSec key may include each side exchanging key material with the other side and establish an agreement on the encryption and integrity methods of IPSec and computing the IPSec key from the Diffie-Hellman key and the key material. As part of the key regeneration process, the active mode VPN endpoint virtual machine may receive a message from the remote peer that includes a sequence number generated by the remote node. The active mode VPN endpoint virtual machine includes the new sequence number in its message to the key storage service 280.

After a new key (be it the Diffie-Hellman key, the IPSec key, or another type of key) is computed by the active mode VPN endpoint virtual machine but before the completion of the rekey operation between the remote peer 350 and the active mode VPN endpoint virtual machine, operations 452-458 are performed to deliver the newly computed key to the standby mode virtual machine. For example, a handshake acknowledgment packet may signify the end of the rekey operation, and operations 452-458 may be performed before the active mode VPN endpoint virtual machine 375a transmits the acknowledgment packet.

At 452, the active mode VPN endpoint virtual machine 375a sends a KeyPropagate message to the key storage service 280. The KeyPropagate message may contain the newly computed key and an identifier of the active mode VPN endpoint virtual machine 375a (e.g., the public IP address it uses for the tunnel, a virtual machine name, etc.). The identifier may be used by the key storage service to update a record in the key store 282 that corresponds to the identifier. The record contains the key(s) used by the active mode VPN endpoint virtual machine and the key storage service may replace the current value of the key with the newly computed value provided in the KeyPropagate message. The keys stored in the key store 282 themselves may be encrypted for added security. Once the key storage service 282 stores the new value of the key in key store 282, at 454 the key storage service may send a KeySync message to the standby mode VPN endpoint virtual machine 375b including the new sequence number. The Key Sync message may contain the new value of the relevant key, which the standby mode VPN endpoint virtual machine 375b receives and stores in its configuration data store. The standby mode VPN endpoint virtual machine 375b thus now has the key and could operate to implement the tunnel should the active mode VPN endpoint virtual machine 375a experience a failure.

At 456, the standby mode VPN endpoint virtual machine 375b returns a KeyACK message back (designating the new sequence number) to the key storage service 280 to indicate that it successfully received the new key. Once the key storage service 280 receives the KeyACK from the standby mode VPN endpoint virtual machine 375b, the key storage service 280 transmits a KeyDelivered message at 458 to the active mode VPN endpoint virtual machine 375a. At this point, the active mode VPN endpoint virtual machine 375a has received an indication that a copy of the newly computed has been received by the standby mode VPN endpoint virtual machine 375b, and can then complete the rekey operation at 460 in accordance with the applicable rekey protocol.

FIG. 12 shows an example of a rekeying operation that is initiated by the active mode VPN endpoint virtual machine 375a. The interaction between the active and standby mode VPN endpoint virtual machines through the key storage service 280 is the same as described above. At 470, the active mode VPN endpoint virtual machine 375a sends a KeyPropagate message to the key storage service 280. The KeyPropagate message contains a newly computed key and an identifier of the active mode VPN endpoint virtual machine 375a. The active mode VPN may generate a new sequence number in this example which propagates through the key synchronization messaging as described above. As explained above, the identifier may be used by the key storage service to update a record in the key store 282 that corresponds to the identifier. The record contains the key(s) used by the active mode VPN endpoint virtual machine and the key storage service may replace the current value of the key with the newly computed value provided in the Key-Propagate message. Once the key storage service 282 stores the new value of the key in key store 282, at 472 the key storage service sends the KeySync message to the standby mode VPN endpoint virtual machine 375*b* to provide the key to standby mode VPN endpoint virtual machine. At 474, the standby mode VPN endpoint virtual machine 375*b* returns a KeyACK message back to the key storage service 280 to indicate that it successfully received the new key, and the key storage service 280 then transmits the KeyDelivered message at 476 to the active mode VPN endpoint virtual machine 375*a*. At this point, the active mode VPN endpoint virtual machine 375*a* and the remote peer 30 can complete the rekey operation at 478 and 480 in accordance with the applicable rekey protocol.

Figure 13A:
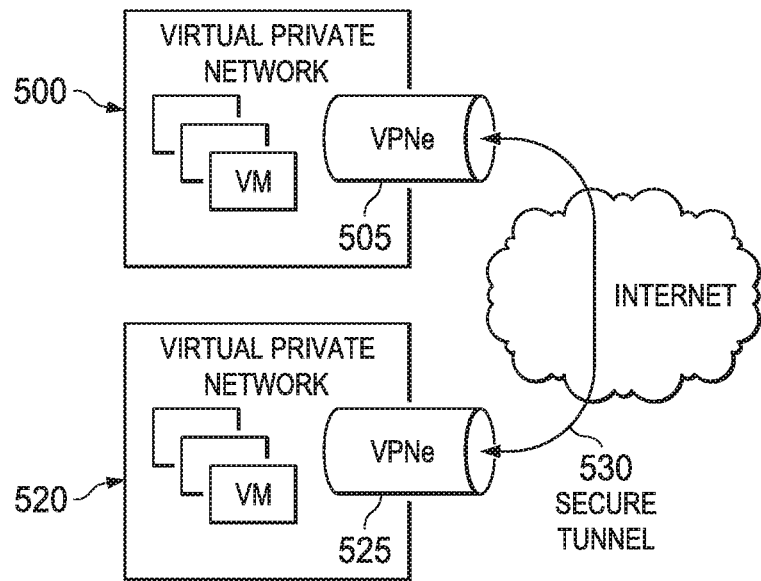
FIG. 13A shows an example of the use of the fault tolerant VPN endpoint node to which create a tunnel between a pair of virtual private networks in accordance with various embodiments.

FIGS. 13A and 14-17 show examples of the use of the fault tolerant VPN endpoint node as described herein, although in some embodiments, the VPN endpoint nodes shown in these examples need not be fault tolerant. In this latter case (non-fault tolerant VPN endpoint nodes), a single VPN endpoint virtual machine instance is created to implement the functionality of the VPN endpoint to establish a secure tunnel. The example of FIG. 13A illustrates two virtual private networks 500 and 520 attached to a corresponding VPN endpoint node. VPN endpoint 505 is attached to virtual private network 500, and VPN endpoint 525 is attached to virtual private network 520. Each VPN endpoint 505, 525 comprises a plurality of virtual machines, such as two virtual machines each containing software capable of performing the functionality of a VPN endpoint node and one virtual machine configured to operate in an active mode and the other virtual machine configured to operate in a standby mode as explained above. A tunnel 530 is established over a public network 530 such as the Internet between the active mode VPN endpoint virtual machines of each respective VPN endpoint node 505 and 525. The two virtual private networks 500, 525 in the example of FIG. 13 may be associated with the same customer account or with two different customer accounts. Some service providers may implement multiple physical and virtual data centers spread across different geographical regions. Each region may have one or more data centers, but the resources (e.g., computers configured to host virtual machines, virtual machine provisioning services, storage services, etc.) of the provider network in one region may be communicatively coupled to the resources in another region over public network 530, whereas the resources within a region may interact with each other via an internal private network of that region. As such, a tunnel can be used to establish a secure connection between virtual private networks in two different regions.

Figure 13B:
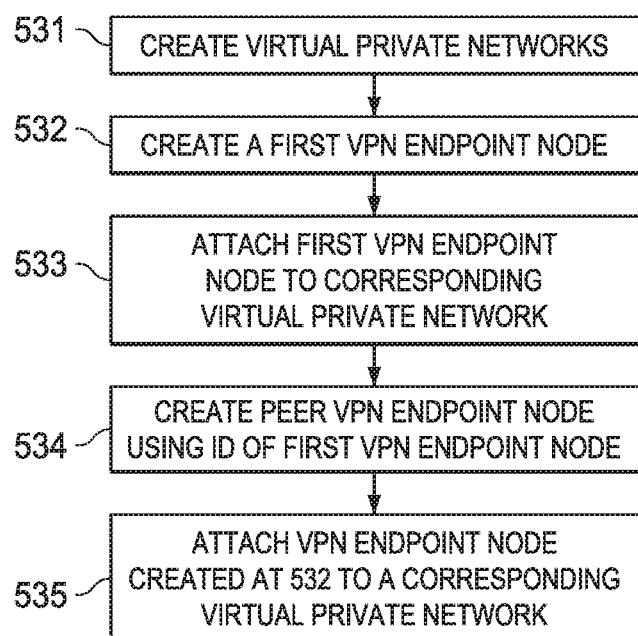
FIG. 13B illustrates a method of peering two VPN endpoint nodes to establish a tunnel between the peered VPN endpoint nodes and their respective virtual private networks.

The process of establishing the tunnel 530 is illustrated in FIG. 13B. The operations may be performed in the order shown or in a different order. Further, two or more of the operations may be performed concurrently instead of serially. The various API requests noted below may be submitted by a customer and processed by the provisioning service 250 or other services within the provider network.

At 531, the method includes creating multiple virtual private networks. In the example of FIG. 13A, virtual private networks 500 and 520 are created. This operation may include launching one or more virtual machines and then assigning virtual machines to a virtual private network. One or more calls may be submitted to virtual machine creation and virtual private network formation APIs to implement this functionality. As a result of creating a virtual private network, the system may assign a unique ID to the virtual private network. As such, one ID is assigned to virtual private network 500, and a separate ID may be assigned to virtual private network 520.

At 532, the method includes creating a first VPN endpoint node. This operation may include submitting a request to the CreateVpnEndpoint API to create a new VPN endpoint node such as VPN endpoint node 505 in FIG. 13A. The request need not contain any input parameters. As explained previously, the input parameters may include a remote IP address, a remote PSK, a tunnel inside IP CIDR block, a remote BGP AS number, and a local BGP AS number. If no input parameters are specified, the provisioning service 250 may generate a PSK string (e.g., a random string), provisions a CIDR block of IP addresses (e.g., a /30 CIDR), and generates remote and local BGP AS numbers from a private autonomous system space (e.g., a value greater than 65,000). The response from the CreateVpnEndpoint API request includes the ID of the newly created VPN endpoint node (e.g., VPN endpoint node 505).

At 533, the process may include attaching the newly created VPN endpoint node (which could be the active mode VPN endpoint virtual machine instance of a fault tolerant VPN endpoint node) to the corresponding virtual private network. For example, VPNe 505 may be attached to virtual private network 500. This operation may include submitting a request to the AttachVpnEndpoint API. The request may include the ID of the first VPN endpoint node created at 532, the ID of the corresponding VPN (e.g., VPN 500), and a subnet ID as applicable. The response from the AttachVpnEndpoint API call includes an ID of the VPN endpoint node attachment to the VPN. At this point, VPNe 505 is attached to virtual private network 500. If the VPN endpoints to be peered together (and their respective virtual private networks) are associated with different customer accounts, one customer can provide the other customer with the ID of the VPNe of the former customer.

At 534, the process of establishing the tunnel 500 includes creating a peer virtual private network endpoint node using the ID of the first VPN endpoint node created at 532. This operation may include submitting a request to a CreateVpnEndpointPeer API that includes the ID of the first VPN endpoint node (e.g., VPNe 505) as an input parameter. Some or all of the state information for the first VPN endpoint node (e.g., PSK, tunnel inside CIDR, remote BGP AS number, local BGP AS number, etc.) may be retrieved and used by the VPN endpoint node created at 533.

At 535, the method includes attaching the VPN endpoint created at 533 to its corresponding virtual private network (e.g., attachment of VPNe 525 to virtual private network 520). The API for this operation may the AttachVpnEndpoint API as described above, the input parameters for which may include the ID of the VPN endpoint created at 533. The ID of the relevant virtual private network and a subnet ID. At this point, data packets can be encrypted and transmitted across the tunnel between the virtual private networks (via their respective VPN endpoints).

Figure 14:
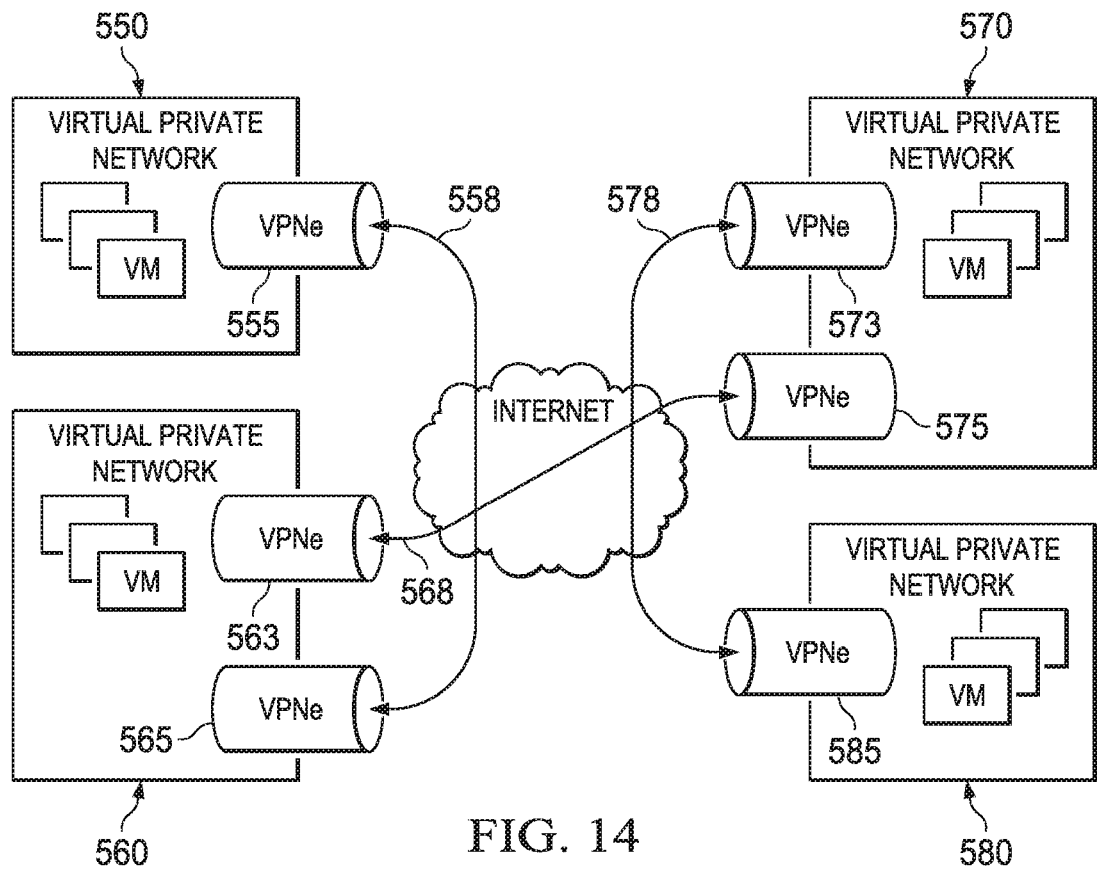
FIG. 14 shows another example of multiple virtual private networks inter-connected by tunnels formed between fault tolerant VPN endpoint nodes attached to each such virtual private network in accordance with various embodiments.

FIG. 14 shows an example of four virtual private networks 550, 560, 570, and 580. At least one VPN endpoint node is attached to each virtual private network, and some virtual private networks have more than one VPN endpoint node attached thereto. A single VPN endpoint node 555 is attached to virtual private network 550. Two VPN endpoint nodes 563 and 565 are attached to virtual private network 560. Two VPN endpoint nodes 573 and 575 are attached to virtual private network 570. A single VPN endpoint node 585 is attached to virtual private network 580. As before, the each VPN endpoint may comprise two virtual machines, each containing software capable of performing the functionality of a VPN endpoint node and one virtual machine configured to operate in an active mode and the other virtual machine configured to operate in a standby mode.

Between the various VPN endpoint nodes, three tunnels 558, 568, and 578 have been established. Tunnel 558 has been established between VPN endpoint nodes 555 and 565 attached respectively to virtual private networks 550 and 560. Similarly, tunnel 568 has been established between VPN endpoint nodes 563 and 575 attached respectively to virtual private networks 560 and 570. Finally, tunnel 578 has been established between VPN endpoint nodes 573 and 585 attached respectively to virtual private networks 570 and 580. By attaching two VPN endpoint nodes to at least some of the virtual private networks in the example of FIG. 14, a mesh network is created providing sufficient communication connectivity for information to be relayed from any one virtual private network to any other virtual private network. The creation of the virtual private networks 550, 560, 570, 580, the virtual private network endpoint nodes 555, 563, 565, 573, 575, and 585, the tunnels 558, 568, and 578, as well as the attachment of the virtual private network endpoint nodes to their corresponding virtual private networks, may be implemented much as described above with respect to the flow diagram of FIG. 13B.

Figure 15:
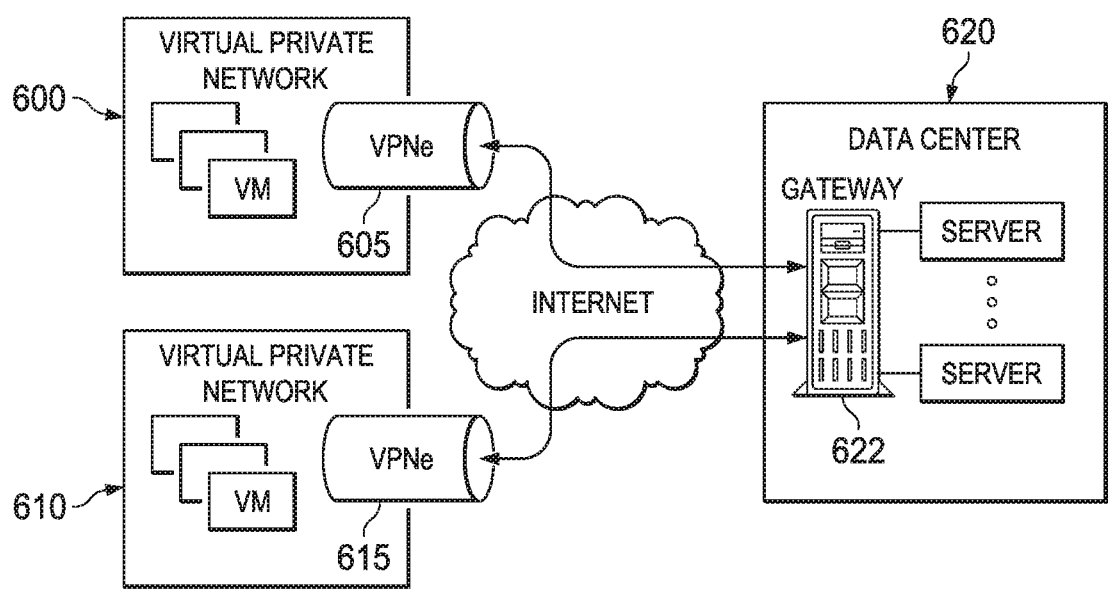
FIG. 15 illustrates multiple virtual private networks of a customer coupled by respective secure tunnels implemented by fault tolerant VPN endpoint nodes to a gateway in the customer's datacenter in accordance with various embodiments.

FIG. 15 shows an example similar to that of FIG. 1, but with two separate virtual private networks 600 and 610 coupled to a single gateway 622 in an external (i.e., external to a provider network hosting the virtual private networks). Virtual provider network 600 is attached to a VPN endpoint node 605, and virtual provider network 610 is attached to a VPN endpoint node 615. The gateway 622 may be a component within, for example, a data center of the customer that created the virtual private networks 600, 610. Tunnel 612 has been established between VPN endpoint node 605 attached respectively to virtual private network 600 and gateway 622. Tunnel 617 has been established between VPN endpoint node 615 attached respectively to virtual private network 610 and gateway 622. The customer that created the virtual private networks 600 and 610 can link their various virtual private networks to a common gateway.

Each VPN endpoint 605 and 615 may be created through issuance of a request to the CreateVpnEndpoint API. The input parameters to the API may include the IP address of the customer's gateway 622, a PSK, the tunnel inside CIDR, and the remote and local BGP AS numbers as explained previously. Once created, each VPN endpoint node 605 and 615 may be attached its respective virtual private network 600 and 610.

Figure 16:
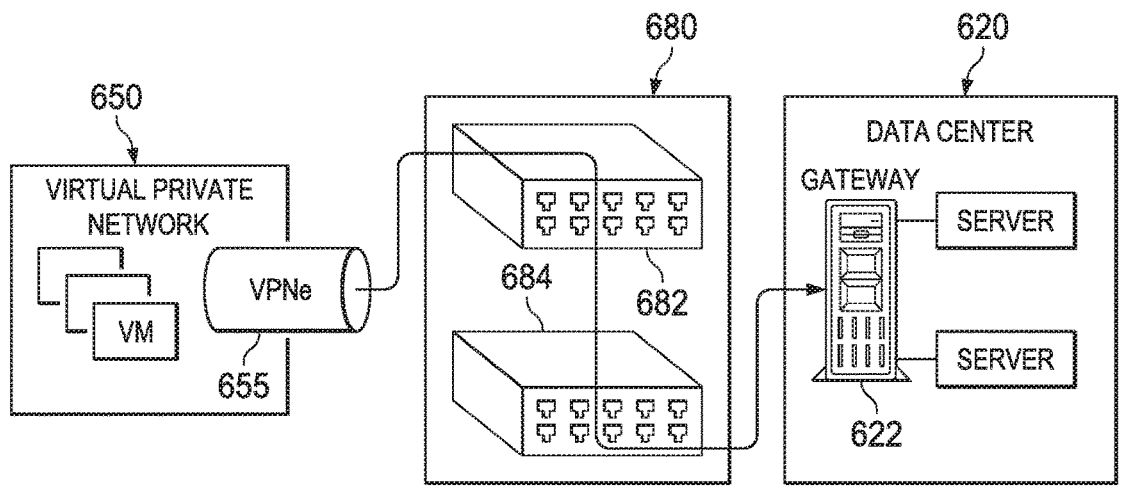
FIG. 16 illustrates the use of a dedicated router in a collation facility to which a secure tunnel can be created by use of a fault tolerant VPN endpoint node in accordance with various embodiments.

FIG. 16 shows an example of the use of a colocation facility 680. The colocation facility includes multiple routers such as routers 682 and 684. Router 684 is dedicated for use by a service provider customer and provides direct dedicated connectivity to a networking device such as gateway 622 in the customer's data center 620. The customer's gateway 622 has a direct communication connection to the dedicated router 684. The customer dedicated router 684 can be coupled to other routers within the colocation facility such as router 682 which may be owned, operated, and otherwise controlled by the service provider for use by more than one customer. FIG. 16 shows an example of a customer virtual private network 650 attached to a fault tolerant VPN endpoint node 655 as described herein. The VPN endpoint node 655 permits the customer to establish a secure connection (e.g., using encryption) through the colocation facility to the gateway 622 in the customer's data center 620.

In some cases, a customer may want to detach a VPN endpoint from one virtual private network and attach it to a different virtual private network. The provisioning service may implement DetachVpnEndpoint and AttachVpnEndpoint APIs for this purpose. The input parameter for the DetachVpnEndpoint API may include the identifier of the current VPNe-to-virtual private network attachment. In response, the provisioning service detaches the VPNe from the corresponding virtual private network (e.g., updates routing tables or IP address mappings to prevent packets from any of the virtual machines in the virtual private network from reaching the now detached VPNe node). The input parameters for the AttachVpnEndpoint API may include the identifier of the VPNe node to be attached to a virtual private network and the identifier of the particular virtual private network for the attachment, as well as a subnet identifier. In response, the provisioning service attaches the VPNe node to the specified virtual private network as described previously.

Figure 17:
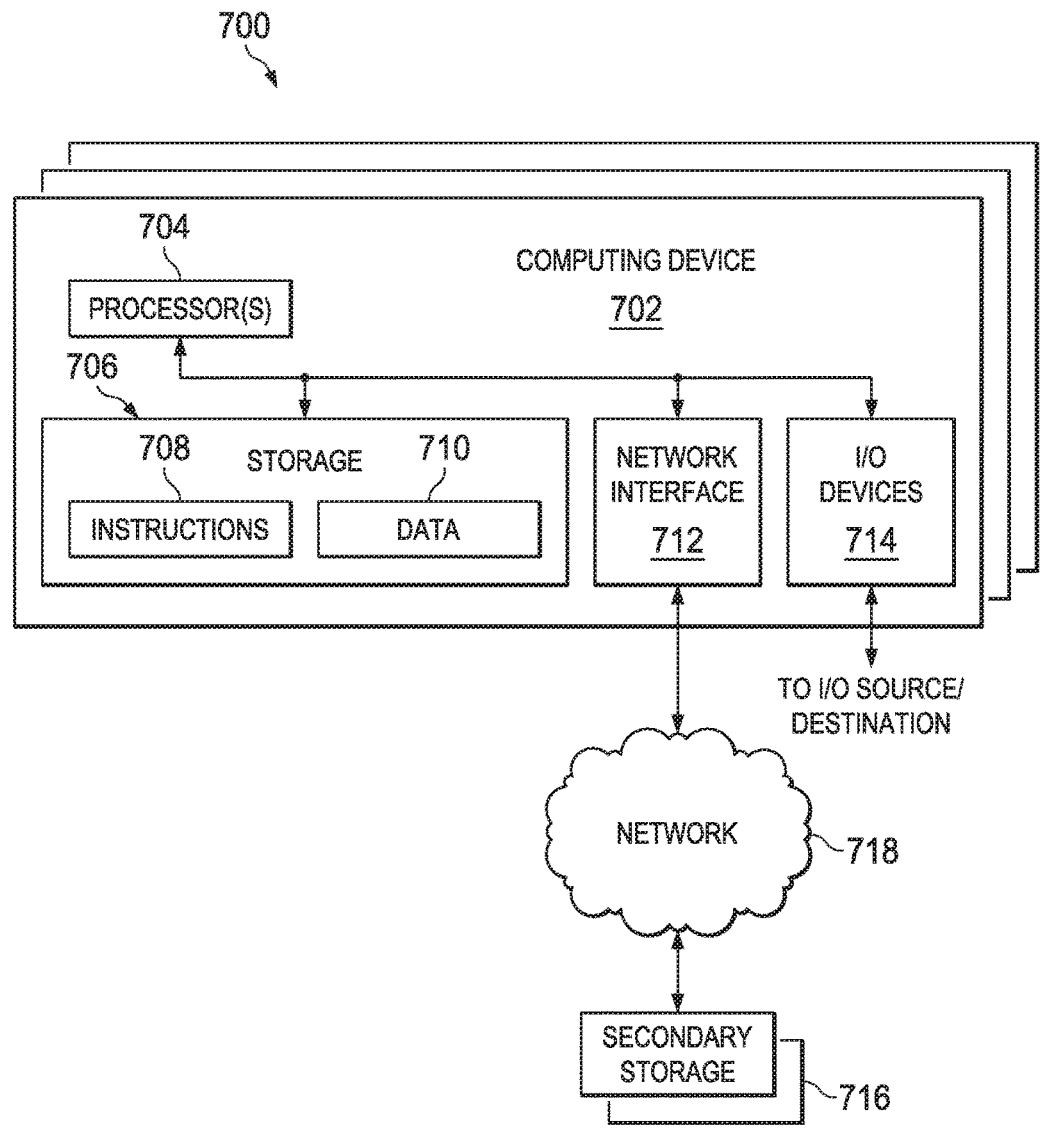
FIG. 17 shows a block diagram of computing node usable to implement any of the hardware and software components described herein in accordance with various embodiments.

FIG. 17 shows a schematic diagram for a computing system 700 suitable for implementation of the VPN endpoint virtual nodes and constituent virtual machines, the virtual machines that comprise virtual private networks, the provisioning service 250, the health monitoring service 260, the health monitoring database 262, the mapping service 270, the key storage service 280 and key store 282, and the various host computers as described herein in accordance with various embodiments. The system includes one or more computing devices 702. The computing system 700 includes the computing devices 702 and secondary storage 716 communicatively coupled together via a network 718. One or more of the computing devices 702 and associated secondary storage 716 may be used to provide the functionality of the VPN endpoint virtual nodes and constituent virtual machines, the virtual machines that comprise virtual private networks, the provisioning service 250, the health monitoring service 260, the health monitoring database 262, the mapping service 270, and the key storage service 280.

Each computing device 702 includes one or more processors 504 coupled to memory 506, network interface 712, and I/O devices 714. In some embodiments, a computing device 702 may implement the functionality of more than one component of the systems described herein. In various embodiments, a computing device 702 may be a uniprocessor system including one processor 704, or a multiprocessor system including several processors 704 (e.g., two, four, eight, or another suitable number). Processors 504 may be any suitable processor capable of executing instructions. For example, in various embodiments, processors 704 may be general-purpose or embedded microprocessors implementing any of a variety of instruction set architectures ("ISAs"), such as the x86, PowerPC, SPARC, or NAPS ISAs, or any other suitable ISA. In multiprocessor systems, each of processors 704 may, but not necessarily, commonly implement the same ISA. Similarly, in a distributed computing system such as one that collectively implements the provider network 110, each of the computing devices 702 may implement the same ISA, or individual computing nodes and/or replica groups of nodes may implement different ISAs.

The storage 706 may include a non-transitory, computer-readable storage device configured to store program instructions 708 and/or data 710 accessible by processor(s) 704.

The storage 506 may be implemented using any suitable volatile memory (e.g., random access memory), non-volatile storage (magnetic storage such as a hard disk drive, optical storage, solid storage, etc.). Program instructions 708 and data 710 implementing the functionality disclosed herein are stored within storage 706. For example, instructions 708 may include instructions that when executed by processor(s) 704 implement the VPN endpoint virtual nodes and constituent virtual machines, the virtual machines that comprise virtual private networks, the provisioning service 250, the health monitoring service 260, the health monitoring database 262, the mapping service 270, and key storage service 280, and/or other components of the service provider's network disclosed herein.

Secondary storage 716 may include additional volatile or non-volatile storage and storage devices for storing information such as program instructions and/or data as described herein for implementing the various aspects of the service provider's network described herein. The secondary storage 716 may include various types of computer-readable media accessible by the computing devices 702 via the network 718. A computer-readable medium may include storage media or memory media such as semiconductor storage, magnetic or optical media, e.g., disk or CD/DVD-ROM, or other storage technologies, Program instructions and data stored on the secondary storage 716 may be transmitted to a computing device 502 for execution by a processor 704 by transmission media or signals via the network 718, which may be a wired or wireless network or a combination thereof. Each of the VPN endpoint virtual nodes and constituent virtual machines, virtual machines that comprise virtual private networks, the provisioning service 250, the health monitoring service 260, the health monitoring database 262, the mapping service 270, and the key storage service 280 and other components described herein may be implemented as a separate computing device 702 executing software to provide the computing node with the functionality described herein. In some embodiments, some of the VPN endpoint virtual nodes and constituent virtual machines, the virtual machines that comprise virtual private networks, the provisioning service 250, the health monitoring service 260, the health monitoring database 262, the mapping service 270, and the key storage service 280 and other components may be implemented by the same computing device.

The network interface 712 may be configured to allow data to be exchanged between computing devices 702 and/or other devices coupled to the network 718 (such as other computer systems, communication devices, input/output devices, or external storage devices). The network interface 712 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 714 may include one or more display terminals, keyboards, keypads, touchpads, mice, scanning devices, voice or optical recognition devices, or any other devices suitable for entering or retrieving data by one or more computing devices 702. Multiple input/output devices 714 may be present in a computing device 702 or may be distributed on various computing devices 702 of the system 700. In some embodiments, similar input/output devices may be separate from computing device 702 and may interact with one or more computing devices 702 of the system 700 through a wired or wireless connection, such as over network interface 712.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of computing devices within a provider network to execute a plurality of virtual machines; and
one or more computing devices within the provider network, the one or more computing devices configured to execute a provisioning service;
wherein, in response to a request to a first application programming interface (API), the provisioning service is configured to launch a first fault tolerant virtual private network endpoint (VPNe) node as a first pair of VPNe virtual machines on separate host computers within the provider network, wherein the first pair of VPNe virtual machines is associated with a first virtual private network (VPN) and comprises a first VPNe virtual machine and a second VPNe virtual machine;
wherein, in response to a request to a second API, the provisioning service is configured to create a second fault tolerant VPNe node as a second pair of VPNe virtual machines on separate host computers and to configure the second fault tolerant VPNe node such that the second fault tolerant VPNe node and the first fault tolerant VPNe node are peered via a secure tunnel over a public network, wherein the second pair of VPNe virtual machines is associated with a second VPN different from the first VPN and comprises a third VPNe virtual machine and a fourth VPNe virtual machine, and wherein the first VPN and the second VPN are connected via the secure tunnel established between the first VPNe virtual machine of the first pair and the third VPNe virtual machine of the second pair; and wherein, upon a determination of a failure of the first VPNe virtual machine of the first pair that is implementing the secure tunnel, the first VPNe virtual machine fails-over to the second VPNe virtual machine of the first pair, and upon a determination of a failure of the third VPNe virtual machine of the second pair that is implementing the secure tunnel, the third VPNe virtual machine fails-over to the fourth VPNe virtual machine of the second pair.

2. The system of claim 1, wherein the first fault tolerant VPNe node includes state information to implement the secure tunnel, and the request to the second API includes an identifier of the first fault tolerant VPNe node and, in response to the request to the second API, the provisioning service is configured to provide at least a portion of the state information of the first fault tolerant VPNe node to the second fault tolerant VPNe node.

3. The system of claim 1, wherein:
through submission of a request containing identifiers of the first fault tolerant VPNe node and the first VPN to an AttachVpnEndpoint API, the provisioning service is configured to attach the first fault tolerant VPNe node to the first virtual private network through at least an update to a first routing table; and
through submission of a request containing identifiers of the second fault tolerant VPNe node and the second VPN to the AttachVpnEndpoint API, the provisioning service is configured to attach the second fault tolerant VPNe node to the second virtual private network through at least an update to a second routing table.

4. The system of claim 3, wherein:
in response to a DetachVpnEndpoint API request including a unique identifier of the first fault tolerant VPNe node, the provisioning service is configured to cause an update to the first routing table to occur to detach the first fault tolerant VPNe node from the first VPN; and
in response to an AttachVpnEndpoint API request including the unique identifier of the first fault tolerant VPNe node and an identifier of a third VPN, the provisioning service is configured to update a third routing table to attach the first fault tolerant VPNe node to the third VPN.

5. The system of claim 1, wherein, in response to a request to the first API without any input parameters, the provisioning service is configured to generate a pre-shared key (PSK), a tunnel inside classless inter-domain routing (CIDR) block of internet protocol (IP) addresses, a remote border gateway protocol (BGP) autonomous system (AS) number, and a local BGP AS number.

6. A system, comprising:
a plurality of computing devices within a provider network to execute a plurality of virtual machines; and
one or more computing devices within the provider network and configured to execute a provisioning service;
wherein, in response to a request to a first application programming interface (API), the provisioning service is configured to launch a first fault tolerant virtual private network endpoint (VPNe) node as a first pair of VPNe virtual machines on one or more host computers within the provider network, wherein the first pair of VPNe virtual machines is associated with a first virtual private network (VPN); and
wherein, in response to a request to a second API, the provisioning service is configured to create a second fault tolerant VPNe node as a second pair of VPNe virtual machines and to configure the second fault tolerant VPNe node such that the second fault tolerant VPNe node and the first fault tolerant VPNe node are peered via a secure tunnel, wherein the second pair of VPNe virtual machines is associated with a second VPN different from the first VPN, and wherein the first VPN and the second VPN are connected via the secure tunnel established between one of the VPNe virtual machines of the first pair and one of the VPNe virtual machines of the second pair.

7. The system of claim 6, wherein a first VPNe virtual machine of the VPNe virtual machines in the first pair is synchronized to an encryption key used by a second VPNe virtual machine of the VPNe virtual machines in the first pair for encryption and decryption of packets sent and received over the secure tunnel.

8. The system of claim 7, wherein the second VPNe virtual machine is configured to perform a process to change the encryption key, and wherein synchronization of the first VPNe virtual machine to the change in the encryption key used by the second VPNe virtual machine includes an affirmative acknowledgement by the first VPNe virtual machine of the change in the encryption key in order for the second VPNe virtual machine to complete the process of changing the encryption key.

9. The system of claim 6, wherein the second fault tolerant VPNe node is peered to the first fault tolerant VPNe node via the secure tunnel over a public network.

10. The system of claim 9, wherein:
in response to an AttachVpnEndpoint API request including a unique identifier of the first fault tolerant VPNe node and an identifier of the first VPN, the provisioning service is configured to update a routing table to attach the first fault tolerant VPNe node to the first VPN;
in response to a request, containing an identifier of a third fault tolerant VPNe node, to the second API, the provisioning service is configured to launch a fourth fault tolerant VPNe node as a pair of VPNe virtual machines on separate host computers within the provider network and to peer the fourth fault tolerant VPNe node to the third fault tolerant VPNe node over the public network; and
in response to the AttachVpnEndpoint API request including a unique identifier of the fourth fault tolerant VPNe node and the identifier of the first VPN, the provisioning service is configured to update the routing table to attach the fourth fault tolerant VPNe node to the first VPN.

11. The system of claim 6, wherein the first fault tolerant VPNe node includes state information to implement the secure tunnel, and the request to the second API includes an identifier of the first fault tolerant VPNe node and, in response to the request to the second API, the provisioning service is configured to provide at least a portion of the state information of the first fault tolerant VPNe node to the second fault tolerant VPNe node.

12. The system of claim 6, wherein:
through submission of a request containing identifiers of the first fault tolerant VPNe node and the first VPN to an AttachVpnEndpoint API, the provisioning service is configured to attach the first fault tolerant VPNe node to the first VPN through at least an update to a first routing table; and
through submission of a request containing identifiers of the second fault tolerant VPNe node and the second VPN to the AttachVpnEndpoint API, the provisioning service is configured to attach the second fault tolerant VPNe node to the second VPN through at least an update to a second routing table.

13. The system of claim 12, wherein:
in response to a DetachVpnEndpoint API request including a unique identifier of the first fault tolerant VPNe node, the provisioning service is configured to cause an update to the first routing table to occur to detach the first fault tolerant VPNe node from the first VPN; and
in response to an AttachVpnEndpoint API request including the unique identifier of the first fault tolerant VPNe node and an identifier of a third VPN, the provisioning service is configured to update a third routing table to attach the first fault tolerant VPNe node to the third VPN.

14. The system of claim 6, wherein, in response to a request to the first API without any input parameters, the provisioning service is configured to generate a pre-shared key (PSK), a tunnel inside classless inter-domain routing (CIDR) block of internet protocol (IP) addresses, a remote border gateway protocol (BGP) autonomous system (AS) number, and a local BGP AS number.

15. The system of claim 6, wherein the one or more computing devices are configured to execute a health monitoring service, wherein the health monitoring service is configured to determine a health status of each of the VPNe virtual machines and, upon determination of a failure of a VPNe virtual machine that is implementing the secure tunnel, initiate a fail-over to the other VPNe virtual machine of the pair.

16. The system of claim 15, wherein the provisioning service is configured to cause the fail-over to occur through re-association of an internet protocol (IP) address of the failed VPNe virtual machine with the other VPNe virtual machine to continue operation of the secure tunnel.

17. A method, comprising:
creating a first fault tolerant virtual private network (VPN) endpoint node as a first pair of virtual machines, wherein a first virtual machine of the virtual machines within the first pair is configured to communicate encrypted packets over a secure tunnel and a second virtual machine of the virtual machines within the first pair is synchronized to an encryption key used by the first virtual machine for encryption and decryption of packets sent and received over the secure tunnel;
attaching the first fault tolerant VPN endpoint node to a first VPN including a first plurality of virtual machines;
creating a second fault tolerant VPN endpoint node, the second fault tolerant VPN endpoint node comprising a second pair of virtual machines;
peering the second fault tolerant VPN endpoint node to the first fault tolerant VPN endpoint node via the secure tunnel;
attaching the second fault tolerant VPN endpoint node to a second VPN including a second plurality of virtual machines such that the second VPN and the first VPN are connected via the secure tunnel established between one of the virtual machines of the first pair and one of the virtual machines of the second pair;
encrypting and transmitting encrypted packets over the secure tunnel established between the first and second fault tolerant VPN endpoint nodes; and
for either of the first or second pairs of virtual machines, determining a failure of a virtual machine communicating encrypted packets over the secure tunnel of the pair and initiating a fail-over to the other virtual machine of the pair.

18. The method of claim 17, wherein creating the first fault tolerant VPN endpoint node comprises submitting a request to a first application programming interface (API), the request including no input parameters, and a response from the first API includes an identifier of the first fault tolerant VPN endpoint node and state information used to establish the secure tunnel.

19. The method of claim 18, wherein creating the second fault tolerant VPN endpoint node comprises:
submitting a request to a second API, the request to the second API including the identifier of the first fault tolerant VPN endpoint node; and
using state information from the first fault tolerant VPN endpoint node for the second fault tolerant VPN endpoint node.

20. The method of claim 17, wherein attaching the first fault tolerant VPN endpoint node to the first VPN includes:
submitting a request to a third application programming interface (API), the request to the third API including an identifier of the first fault tolerant VPN endpoint node and an identifier of the first VPN; and
updating a routing table so that an internet protocol (IP) address of a virtual machine in the second VPN is mapped to the first fault tolerant VPN endpoint node.

* * * * *